US008253780B2

(12) United States Patent
Raymond et al.

(10) Patent No.: US 8,253,780 B2
(45) Date of Patent: Aug. 28, 2012

(54) 3D DISPLAY SYSTEM USING A LENTICULAR LENS ARRAY VARIABLY SPACED APART FROM A DISPLAY SCREEN

(75) Inventors: Mark A. Raymond, Littleton, CO (US); Howard G. Lange, Mount Prospect, IL (US); William K. Seifert, Littleton, CO (US)

(73) Assignee: Genie Lens Technology, LLC, Golden, CO (US)

( * ) Notice: Subject to any disclaimer, the term of this patent is extended or adjusted under 35 U.S.C. 154(b) by 1212 days.

(21) Appl. No.: 12/042,147

(22) Filed: Mar. 4, 2008

(65) Prior Publication Data
US 2009/0225154 A1    Sep. 10, 2009

(51) Int. Cl.
H04N 13/04     (2006.01)
H04N 9/47      (2006.01)

(52) U.S. Cl. ............... 348/51; 348/52; 348/53; 348/54; 348/55; 348/56

(58) Field of Classification Search ............ 348/51–59; 359/619
See application file for complete search history.

(56) References Cited

U.S. PATENT DOCUMENTS

| 4,498,736 A |   | 2/1985  | Griffin |  |
|---|---|---|---|---|
| 5,083,199 A | * | 1/1992  | Borner ............................ | 348/59 |
| 5,204,775 A |   | 4/1993  | McDevitt |  |
| 5,303,322 A |   | 4/1994  | Winston et al. |  |
| 5,351,339 A |   | 10/1994 | Reuber et al. |  |
| 5,362,351 A |   | 11/1994 | Karszes |  |
| 5,548,450 A |   | 8/1996  | Kang |  |
| 5,644,431 A |   | 7/1997  | Magee |  |
| 5,647,151 A |   | 7/1997  | Fantone et al. |  |
| 5,680,186 A | * | 10/1997 | Watanabe et al. ............... | 349/95 |
| 5,771,039 A | * | 6/1998  | Ditzik ........................... | 345/178 |
| 5,833,068 A |   | 11/1998 | Fantone |  |
| 5,850,913 A |   | 12/1998 | Fantone et al. |  |
| 6,057,878 A | * | 5/2000  | Ogiwara et al. ................ | 348/56 |
| 6,070,350 A |   | 6/2000  | Fantone et al. |  |
| 6,084,713 A | * | 7/2000  | Rosenthal ...................... | 359/619 |
| 6,226,907 B1 |   | 5/2001  | Conley et al. |  |

(Continued)

OTHER PUBLICATIONS

"How Computer Monitors Work" http://computer.howstuffworks.com/monitor.htm/printable; retrieved Mar. 5, 2008, pp. 1-18.

(Continued)

Primary Examiner — David Czekaj
Assistant Examiner — Chikaodili E Anyikire
(74) Attorney, Agent, or Firm — Marsh Fischmann & Breyfogle, LLP; Kent A. Lembke

(57) ABSTRACT

An image display system for displaying interlaced images to achieve three dimensional effects. The system includes a user electronic device, such as a computer or television, with a display with a faceplate. The electronic device operates the display to generate an image that includes an interlaced portion at an inner display surface or location at an internal offset distance from an outer surface of the faceplate. The image display system includes a lens array with lenticules configured to focus through the lens array material, through an air gap, and into the faceplate the internal offset distance rather than simply on the back of the lens array. The display system may also include a mounting mechanism for selectively positioning the lens array relative to the faceplate to adjust the size of the air gap so as to focus the lens array onto the image being displayed within the display device.

14 Claims, 10 Drawing Sheets

U.S. PATENT DOCUMENTS

| | | |
|---|---|---|
| 6,256,149 B1 | 7/2001 | Rolfe |
| 6,337,721 B1 | 1/2002 | Hamagishi et al. |
| 6,406,062 B1 | 6/2002 | Brooks et al. |
| 6,542,646 B1 * | 4/2003 | Bar-Yona ............... 382/284 |
| 6,551,014 B2 | 4/2003 | Khieu et al. |
| 6,624,947 B2 | 9/2003 | McKinley |
| 6,751,024 B1 * | 6/2004 | Rosenthal ............... 359/626 |
| 6,833,829 B2 * | 12/2004 | Brooks et al. ............ 345/419 |
| 6,906,686 B2 | 6/2005 | Ishikawa |
| 6,943,953 B2 | 9/2005 | Raymond |
| 6,984,425 B2 | 1/2006 | Raymond |
| 7,002,748 B1 | 2/2006 | Conley et al. |
| 7,075,736 B1 | 7/2006 | Lundgren |
| 7,099,080 B2 * | 8/2006 | Lipton et al. ............ 359/463 |
| 7,234,257 B2 | 6/2007 | Bar-Yona |
| 7,298,552 B2 * | 11/2007 | Redert ................... 359/463 |
| 7,311,607 B2 | 12/2007 | Tedsen et al. |
| 7,728,902 B2 * | 6/2010 | Kishigami et al. ........ 348/340 |
| 7,857,700 B2 * | 12/2010 | Wilder et al. ............ 463/33 |
| 2002/0085287 A1 | 7/2002 | Egawa |
| 2004/0192430 A1 | 9/2004 | Burak et al. |
| 2004/0263969 A1 | 12/2004 | Lipton et al. |
| 2005/0053737 A1 | 3/2005 | Raymond et al. |
| 2005/0059487 A1 | 3/2005 | Wilder et al. |
| 2006/0203339 A1 | 9/2006 | Kleinberger et al. |
| 2006/0215018 A1 * | 9/2006 | Fukushima et al. ....... 348/51 |
| 2006/0284974 A1 * | 12/2006 | Lipton et al. ............ 348/59 |
| 2007/0279538 A1 | 12/2007 | Thomas |
| 2009/0201363 A1 * | 8/2009 | Grossmann .............. 348/59 |

OTHER PUBLICATIONS

"How Television Works" http://electronics.howstuffworks.com/tv.htm/printable; retrieved Mar. 5, 2008, pp. 1-13.

* cited by examiner

3D DISPLAY SYSTEM USING A LENTICULAR LENS ARRAY VARIABLY SPACED APART FROM A DISPLAY SCREEN

BACKGROUND OF THE INVENTION

1. Field of the Invention

The present invention relates, in general, to methods and devices for displaying three dimensional (3D) images including lens arrays and devices for use in viewing or displaying images that are interlaced to display animated, 3D, and other images, and, more particularly, to display or optical systems, as well as products incorporating such systems and methods of using such systems, that include a lenticular lens array or substrate used in combination with electronic devices, such as computers and handheld electronic devices and televisions, to allow a user to clearly view or focus on an image displayed on the display screen or monitor of the electronic device (e.g., a digital image including a set of interlaced images).

2. Relevant Background

For many years, entities doing business on the internet have searched for ways to drive user traffic to their web sites. Many web sites have even been created with the sole goal of getting a large number of hits or visits so as to increase their revenues by providing advertising and links to other sites on their web site. More recently, businesses that have been traditionally brick and mortar businesses have been attempting to develop a web-based presence and to try to get their customers to make purchases and obtain services through their web site. This allows these businesses to both reach more customers, e.g., customers that cannot readily visit one of their physical locations, and also to reduce their overhead such as by allowing the business to reduce the number of branches or locations they maintain to server their customers. For example, the banking industry is making a large push to convince their customers to bank online so that they can operate fewer branch offices. Additionally, banks and other businesses are trying to encourage their customers to pay their bills online or electronically to avoid costs associated with processing paper invoices and customers' paper checks. As a result, there is an ongoing and increasing demand for new ways to encourage people to visit and use online services such as those provided through web sites via the Internet.

One recent technique to drive Internet traffic is the use of alternate reality games or ARGs. For example, ARGs have been used by television networks and movie companies to cause fans of certain shows to search the web for clues to win a game and, in some cases, prizes are awarded to the successful Internet players or detectives. In one implementation, viewers of a show were directed to a first web site where they had to solve a puzzle to get directions to or a link to another web site and so on. These Internet games or scavenger hunts have often been effective marketing campaigns with some being driven by fans' desires to learn more about the show's characters.

Another technique that has been tried by marketing companies is the use lottery type games. In these games, a flyer is sometimes mailed to or otherwise provided to an individual. The flyer may include a code along with a web site URL. The individual is instructed to visit the site to see if their code is a winner in the game. This type of game has also been used with beverages with the code being provided under a portion of the label or on the inside of a bottle cap. In some more complex systems, a game piece is provided to the consumer or player, and the game piece is printed with a layer of colored ink in a pattern that includes a hidden image that is viewable when matched with an electronic image provided on a web site. Alternatively, the pattern may be used as a filter to allow viewing of a hidden image in the electronic image. Such hidden game pieces are described in more detail in U.S. Pat. No. 6,406,062 to Brooks et al.

While the use of ARGs, game or lottery codes, and color filtered game pieces have enjoyed some success in marketing businesses and driving traffic to particular web sites, there remains a significant demand for new and interesting ways to get more and more people to participate in such games or to visit web sites. Preferably, methods and systems created to address these demands would be inexpensive to implement, would be effective in increasing a large number of people to participate, and would be useful for encouraging a desired action by the web site visitor (such as to pay their bills online, to follow a link to another site, to provide contact/demographic information, and the like).

SUMMARY OF THE INVENTION

The present invention addresses the above problems by providing an image display system and method that is adapted for displaying an electronic or digital interlaced image that is displayed on a display screen such as on a computer monitor or screen, a handheld electronic device screen, and/or a television or player screen. The interlaced image is provided as a digital file comprising one or more sets of interlaced images adapted for viewing with a lenticular lens array (e.g., to not be readily viewable without such a lens array so as, for example, to hide the image that may include words or numbers associated with a game indicating information to a player such as whether they are a winner), and the digital file may provide still image or a video image when it is transmitted to and/or displayed on a display screen. Significantly, the image display system includes a lens assembly with a lenticular lens array or substrate fabricated for use with displayed interlaced image, e.g., with proper pitch and lenticules or lens per inch (LPI), and the lenticular lens array is used to bring the displayed image into focus for a user operating the lens assembly.

Prior lenticular lens arrays were precisely fabricated with elongate lenses provided on one side of the substrate and a planar surface on the other. An interlaced image was then provided or printed upon this planar surface, and the lenses or lenticules were configured to focus upon the planar surface and the mated image, e.g., with each lenticule having a very small focal length as the substrate typically is less than about 0.25 inches or the like thick. Conventional lenticular sheets are, as a result, not suited for use with the display technology used for computers, handheld electronic and computer devices, DVD players, televisions, and other electronics because these devices do not display the image on their outer surfaces. In other words, placing a conventional lenticular lens array against a computer monitor screen will provide a lens array that focuses on the outer surface of the monitor screen, but an interlaced image displayed via the monitor screen is displayed at a location that internal to the monitor or spaced apart or offset from the outer surface of the screen. The inner display region or surface (i.e., the location of the displayed image in the electronic device or the image source) is in some devices offset by the thickness of a layer of glass or hard plastic provided in the display screen but in other cases the image is displayed further within the electronic device. In any case, a conventional lenticular lens array paired with an image that is offset from the back surface of the lens array or substrate will produce an image that is blurry and out of focus for a viewer of the display screen. Another problem with attempting to display electronic or digital interlaced images using existing display technology is that the offset distance varies among differing electronic devices and even among differing manufacturers of a similar device. As a result, a lens array that may be suited for one device may not be useful with another device as the range of offsets is generally about 1/32 to about 3 inches or more.

Embodiments of the display system of the present invention address these problems by providing a lens assembly that includes a lens array or lens substrate with a plurality of elongate, parallel lenses or lenticules that are configured to focus through the substrate or array to a location (e.g., a focal plane or region) that is spaced apart from the back surface the lens substrate or array. This configuration of the lens array allows the lens assembly to focus into the display screen (e.g., through the outer glass/plastic layer or further) and, preferably, on or near the inner display surface or region. In some embodiments, the lens array is placed directly on an outer surface of the display screen adjacent the portion of the screen displaying the electronic or digital image. Such embodiments may involve determining the offset distance or location of the inner display surface or region relative to the outer surface of the display screen for each display screen, and then manufacturing a lens array adapted for use with each of these display screens (e.g., a set of lens arrays or substrates with differing lenticules or lens configurations selected to suit the particular display screen and/or display technology such as a CRT screen versus a LCD screen or the like).

In other embodiments, though, the lens assembly is adapted to provide a variable distance or spacing (or a distance that can be adjusted by a user) between the back of the lens array or substrate and the outer surface of the display screen. Initial steps in the use of the display system may involve mounting or attaching the lens assembly proximate to the display screen, displaying an interlaced image, and then moving the lens array or substrate relative to the outer surface of the display screen to adjust the spacing and to bring the image into focus (e.g., a focusing step). In this manner, a single lens array configuration may be used with a range of display technologies or arrangements by altering the lens array display screen spacing to align or substantially align the focus plane or region of the lens array with the inner display surface or region (i.e., location of the displayed image) within the display device such as within a computer monitor or within a television. For example, the lens array may be designed with a focus plane or region that is about 1/16 to about 3 inches or more behind or spaced apart from the rear or back surface of the lens array (e.g., about 1 to 2 inches in some cases with 1.5 inches being one useful design setting or use with a wide range of display devices). The lens assembly may be mounted with the lens array spaced apart a first distance, the image may be created or displayed within the display device, and the user may then move or position the lens array closer or farther away until the image is more clearly displayed or in focus through the lens array such as with the focus plane or region of the lens array being near or coinciding with the location of the displayed image (e.g., about 1/16 to about 3 inches or more internal offset from the outer surface of the display screen).

More particularly, a lens array is provided for use with a display device that is operated to electronically display an image including an interlaced image on a display screen. For example, the display device may be a computer or television monitor, a handheld electronic device such as a PDA, a personal music/video player, a phone, or a video game player, or other imaging devices. The displayed image is not displayed upon the outer surface of the display screen but is instead provided on an inner surface (or more virtual region) some offset distance behind the outer surface of the display screen. To provide focusing within the display device on such an image, the lens array includes a substrate of a material that is transparent or at least translucent to light. A plurality of parallel, elongate lenses or lenticules are formed or provided on one side of the substrate.

Significantly, the lenticules are configured to have a focal length that is greater than the thickness of the lens array substrate such that they can be used to focus on the inner display surface and the displayed image when the lens array is positioned proximate to the outer surface of the display screen (e.g., over the interlaced image with the lenticules aligned with image interlaces or slices). The focal length may be up to about 6 inches or more but more typically is less than 3 inches and more than about 1/16 inches. Further, the focal length may be defined as being greater than about a combination of the offset distance aid the thickness of the lens array substrate such that there is a focusing or air gap between the back of the lens array substrate and the outer surface of the display screen (e.g., the lenticules or lenses focus through the substrate, through the air gap, and through at least a portion of the display screen such as through a glass, plastic, or ceramic faceplate and onto the location or source of the displayed interlaced image). In some embodiments, the lenticules are provided at a constant pitch but in others it is desirable for adjacent lenticules to be provided at differing pitches such that the array may have two or more pitches across its width. According to another aspect, the interlaced image in the displayed image may be incomplete or a partial image that is missing a matching section or subimage, and the lens array is adapted to include the matching section of the interlaced image (e.g., with a printing of the image on one side of the substrate or the like), and then when the lens array is used, the matching section and the partial image are viewed concurrently to produce a full image. According to another aspect, the lens array may include a label on the substrate providing a set of data such as a source of the displayed image (e.g., a URL of a website, a time and network for a television show, a scene of a recorded movie, a level of a video game, or the like), and the displayed image is formed based on a signal received from the source.

According to another aspect of the invention, an image display system is provided that includes one or more user electronic devices (such as computing devices, televisions, digital video players, video game playing devices, wireless communication devices, and portable personal electronic devices used for playing music and/or videos). The user electronic device includes a display (such as one using CRT, LCD, plasma, or other display technologies) with a screen or faceplate with an outer surface. The electronic device operates the display to generate or display an image that includes an interlaced portion, with the displayed image being located at an internal offset distance from the outer surface of the faceplate. The image display system also includes a lens array with a first surface having a plurality of elongate lenses or lenticules and a second surface opposite die first surface. The lens array is formed with a thickness of a translucent to transparent/clear material (such as plastic, glass, ceramic, or the like). The lenses are configured such that they focus through the lens array material onto a focus plane or region that is spaced apart from the back or second surface of the lens array, with the offset being at least about the offset distance of the display.

The system may further include a mounting mechanism that is attached to or mates with the user electronic device (e.g., is attached to or is supported by the housing of the device). The mounting mechanism is adapted to position the lens array proximate to the faceplate such that the elongate lenses are adjacent to the interlaced portion of the displayed image but with a gap between the second surface of the lens array and the outer surface of the faceplate (e.g., with a focusing or air gap through which the lens focuses). The mounting mechanism may be operable to selectively position the lens array relative to the faceplate to maintain the second surface substantially parallel to the outer surface of the faceplate while allowing the gap to be altered or changed e.g., such that the size of the gap is selected or set to have the focus plane (or focal length) of the lenses coincide with the location of the displayed image. In some cases, this gap will be adjustable from about 1/16 inch to about 3 inches. The display system may also include a server or other source of digital images (such as a web site host server), and the electronic user device may be configured to communicatively linked (e.g., networked enabled, a wireless communication device, or the like) with the source to request and receive an image with an interlaced portion. The interlaced portion may include data related to a contest or online game and define a first set of distributed images as winners and a second set as non-winners of the contest or online game.

BRIEF DESCRIPTION OF THE DRAWINGS

FIG. 14 illustrates a portion of an image display system of the invention similar to FIGS. 12 and 13 that provides a lens array in a cover for a personal electronic device such as a phone, a music or video player, a handheld video game player, or the like.

DETAILED DESCRIPTION OF THE PREFERRED EMBODIMENTS

Figure 1:
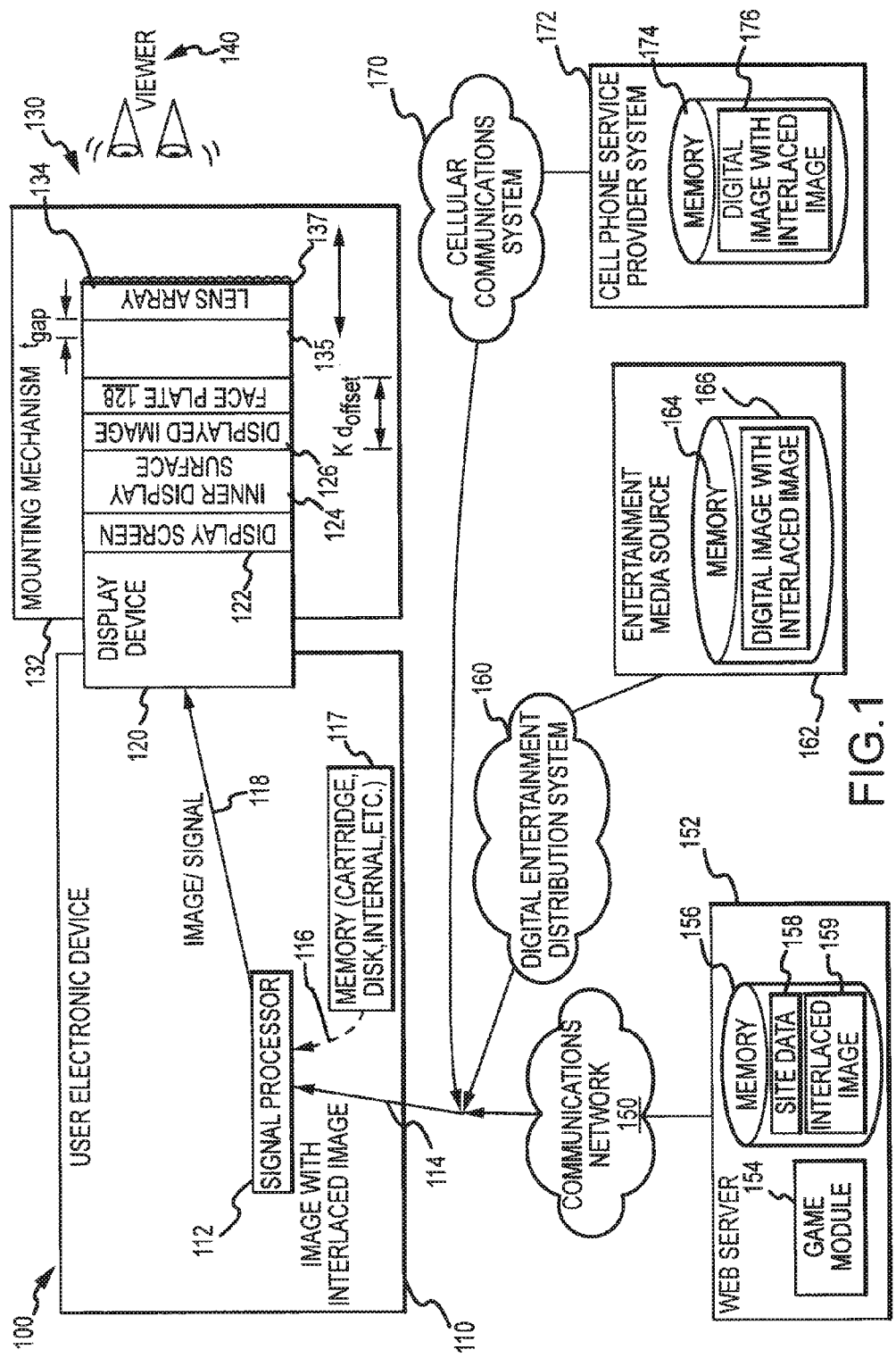
FIG. 1 is a functional block illustration of an image display system of one embodiment of the invention showing a user electronic device being used to display images and a lens assembly being used to focus the interlaced image portion of the displayed images using a variable focusing or air gap between the lens array and the display screen.

Generally, the present invention is directed to an image display system and image display methods that utilize a lens assembly with a lens array that is uniquely suited for use with interlaced images displayed using electronic display devices such as computer monitor and other computer screens, handheld electronic device screens, DVD and other videos player device screens, and television and similar display screens. In the display systems described herein, these display devices are used to display an interlaced image, e.g., a still or video image with 3D or other special effects, such as may be displayed from memory, a DVD or other removable memory device or media, or from a transmitted signal such as a transmission of digital data from a web server over the Internet or a television or other entertainment broadcast (e.g., digital cable or satellite television signals, video or other games provided over the Internet, or the like). The display device typically includes a display screen with an outer surface and in use the display device displays the interlaced image at or on an inner display surface or region that is offset from the outer surface of the display screen a particular distance (which may vary significantly among the display devices). The lens assembly includes a lens array that is configured to focus not on the back surface (e.g., the surface opposite the lenses or lenticules) of its substrate but instead at a focus plane or region that is some spacing or distance from the back surface so that the lens array can be used to focus within the display device upon the inner display surface or region. In this regard, the lens assembly typically includes a mounting mechanism that allows it to be positioned adjacent or near the location of the displayed image and in a plurality of distances from the outer surface of the display screen as measured from the back surface of the array, e.g., the mounting mechanism may allow the lens array or substrate to be pushed toward the display screen, pivoted toward and away from the screen, or otherwise manipulated to move through a range of spaces or offset distances (which typically leave an air gap between the substrate and display screen).

Before referring to the attached figures and explaining in detail exemplary embodiments of the invention, it may be useful to provide further overview of the concepts with description of some representative implementation details. In the past, lenticular devices or lens arrays were generally used for viewing interlaced graphics provided upon printed media. Viewing interlaced images that are presented on an electronic device or other non-printed media such as video game images, contest images delivered online, or the like has proven difficult with conventional lenticular devices because these devices are engineered or designed to focus on the back of the lens array, e.g., directly where the interlaced image is generally printed. The inventors recognized that conventional lenticular devices cannot be used most electronic display technologies and/or devices since they do not focus where the image is actually being displayed in the display device. However, the inventors also recognized that where would be a significant demand for a lens array that could be used with television and computer monitors as well as many other electronic devices such as personal digital devices including cellular phones, music and video players (such as iPod™ devices distributed by Apple Computers, Inc. and similar devices), and the like. These devices can readily be used to receive from a network or retrieve from memory a digital image that is entirely formatted as an interlaced image or that includes a portion or subimage that is an interlaced image and to display such an interlaced image on their monitor or display screen. The images may be used to create a 3D or other desirable effect in a movie or other video, in a still image such as for use in an online game or contest, or in other applications such as for viewing a subset of data that is considered secure or personal (e.g., a set of information such as a security code or an individual's information such as their social security number, credit card information, or the like). The challenge facing the inventors was to create a lens assembly or device for viewing such images.

Creating a device for viewing interlaced images on an electronic devices presented a number of challenges, but the inventors recognized that while prior lenticular devices have been designed to focus on the back of the lens array or substrate, it may be desirable with electronic devices to create a lens array with longer focal lengths. Specifically, the inventors designed a number of lens arrays in which the focal lengths of the lenses/lenticules or lens arrays are chosen to be greater or longer than the thickness of the substrate so as to focus at a distance from this back surface of the substrate. In use, the lens arrays of the invention can be used to focus inside various screens of electronic devices when the lens array or substrate is manually held up or positioned with a mounting mechanism near or adjacent the outer surface of the display screen. For example, the lens array typically will be substantially planar, and it can be positioned so as to be parallel or approximately parallel with the outer surface of the display screen (or with the inner display region or surface upon which the image is displayed). Since the screen and/or display technology may differ for differing electronic devices, the focal lengths of the lens arrays are selected to be large enough to be used with a range of such electronic devices (e.g., such as by choosing a focal length or a distance from the back surface to the focus plane of the lenses that is equal to or greater than about the biggest anticipated offset distance between the outer surface of the display screen and the inner display surface or region in the device). The focal lengths to provide a more universal lens assembly are engineered or selected to be on the long side or larger than typically needed such that the lens array can be positioned relative to the display screen and the spacing or thickness of the air gap is varied to focus the lens array a desired distance into the screen.

In a typical implementation, the display assembly includes a lens array that is extruded, cast, or embossed from a transparent or at least translucent sheet of material such as a plastic, glass, ceramic, or the like. The lens array is designed with elongate parallel lenses or lenticules that have a focal length equal to a distance that is longer or greater than the thickness of the lens sheet or lens array substrate. The lens array may be sized and shaped in numerous ways to practice the invention but typically is paired in shape and size to suit the screen (e.g., to be about the same or smaller in size and shape than the display screen) and to suit the displayed image (e.g., if the displayed image is a 4-inch by 4-inch square the lens array may be a similar square or one that is larger, if the displayed image is a circular shape the lens array may be a circle with a radius selected based on the image, and so on).

For example, the lens array may be provided as part of an offer or game card (e.g., a card about the size of a standard credit card or the like) mailed or otherwise provided to an individual along with a URL of a web site. The lens array may also be provide as part of a card or device (e.g., a personal music/video player cover) provided with a newspaper or magazine (e.g., in a marketing offer in a sleeve, enveloped, glued to a page, as a detachable feature, or the like), provided as a premium with a purchase of a consumer or retail product, in a product package, and/or as a standalone device such as an accessory to the computer or electronic device to view 3D images such as for a game player or for a laptop or the like. The web site provider may deliver to the user's computing or electronic device that visits the wet) site (e.g., using an Internet browser or similar application) an interlaced image that is the same or smaller in size and shape as the delivered card with the lens array.

The user can then hold or mount the card near the screen. The lenticular lens array is placed over the screen (e.g., parallel and adjacent or the like). The lenticular lens array can be thought of as reaching inside or focusing internal to the monitor or display screen to the source of the image (e.g., an RGB, digital, or other electronic image). The lens array is positioned or set by moving the standalone card or manipulating a mounting mechanism that supports the lens array on or relative to the display screen to a correct gap or spacing to focus into the screen onto the displayed, interlaced image. The lens array may be made in any of a number of lenticules per inch (LPI) to practice the invention and, of course, to suit the displayed image. In some embodiments, the lens array is fabricated at about 5 to 60 LPI with about 15 to 30 LPI being useful for many anticipated applications.

In designing the display assembly, the inventors considered a number of aspects that appear to be unique to their technology relative to conventional lenticular devices. The lens array is preferably engineered and manufactured with a focal length longer or greater than the thickness of the lens array substrate such that the lenses or lenticules focus on a focus plane or region spaced apart from the reverse or opposite side of the lens array or lens substrate. Methods of the invention may include transmitting an interlaced image or providing an interlaced image as part of a signal such as part of an online game, a video game, a video or broadcast video image, a still or video image provided via access to a web site or other network connection, or the like. The interlaced image is then viewable only with use of the lens array or lens assembly including such a lens sheet or substrate. In some cases, the lens array functions as a decoder allowing viewing of the interlaced image that includes slices or portions of images provided with a frequency or LPI corresponding to that of the lens array. The method may include using the providing a person or user with the lens array along with instructions or information for them to find the interlaced image (e.g., directing them to a URL of a web site or the like) and to use the lens array as a decoder to view the information or data provided in the focused interlaced image such as via a CRT, LCD, or other monitor or electronic device display or via a television screen. The lens array may also be used in conjunction with video games to create a 3D game with the game image signals generated by the online game server or local game controller/processor device including at least a portion that is an interlaced image. The lens array may also be used in conjunction with music and/or video devices used to play music and/or videos stored in the memory of the device (or accessed via the device but downloaded from the Internet). The lens array may also include an image portion such as a printed image provided on the lens side or reverse side of the array that is used along with the displayed interlaced image to produce a combination image that is complete or is decoded (e.g., only makes sense if the image is text or a code or the like) when the image portion on the lens array is added to the displayed interlaced image. In other words, the lens array may be partially printed with part of the interlaced image, and, in an online contest/game setting, the lens array may be provided as part of a game piece or card, with the interlaced image remaining the same for all contestants/viewers but the game piece being a winner when the image is completed or accurately decoded (note, in other cases, the lens array may be the same for all contestants/viewers with the interlaced image being a winner for only one or a smaller subset of the contestants/viewers that access the web site or the like). Typically, the lens array is translucent to transparent and substantially clear, but in some cases, the material of the lens array may be colored or tinted to achieve a desired effect such as to color the displayed image throughout or in select portions.

According to another aspect the method may include a step of sizing (and/or shaping) one or more interlaced images to match the size (and/or shape) of the lens array. This may be done with the browser application itself such as by requesting a sizing module run as part of a web browser to allow a user to size the image by themselves to suit the lens array they presently are using. More typically, the server or distributor of the interlaced image will size the image prior to transmission to the end user (e.g., in response to an answer to a query regarding their lens array size and/or shape) such as from a standard full screen version of the image to a credit card sized image when the user indicates he has that type (size and shape) of array. In some applications, the displayed interlaced image is provided as a part or portion of a larger image. For example, a marketing campaign for a retail product such as a soda or other beverage may display an image of their product on a web site or as part of a television commercial, and the interlaced image revealing if a viewer is a winner may be provided as a component or subpart of the product (e.g., the interlaced image may be provided on the label of the displayed product such as immediately below the products branding graphics). In some embodiments, the lens array is not fabricated with a consistent or single frequency across its width (such as 20 LPI throughout) but is instead formed with two or more frequencies such as 20 LPI for a fraction of the lenticules or lenses and 30 or 40 LPI for the remaining fraction of the lenticules or lenses. In such cases, the individual lenses or lenticules may have the same or a similar focal point or focal length, and, therefore, the radius of each lens may be the same or similar. In some cases, the lens array may include lenses or lenticules that are provided at a slant or angle (e.g., the axis of the elongate lenses may be transverse or not parallel to a side of a rectangular array) such as up to 45 degrees or more to obtain a desired combination of 3D and motion effects.

The mounting mechanism or device may be a removable device that may readily slip over the display screen or monitor device or over the entire device or may readily mount onto the computer or other electronic device (such as with additional components, with adhesive, with Velcro, or other attachment methods. The mounting mechanism may include brackets that attach to the electronic device and support a positionable frame that is adapted to receive and support the lens array. The bracket and frame combination is configured in some cases to be removable and/or to be remountable, and, in most cases, to be operated or maneuvered (such as by pivoting arms, by sliding pins in slots, or the like) to position the lens array relative to the screen display to achieve a desired focusing gap (or air gap) such that the mounting mechanism and the lens array are useful with more than one electronic device (although custom mounting mechanisms and/or lens arrays may be provided for some electronic device such as to comply with demands of a particular device manufacturer for a unique image display system). Again, as will be explained in detail below, the focusing gap as measured from the back or opposite surface of the lens array or substrate to the outer surface of the display screen typically will be less than about 6 inches, more typically less than 3 inches (such as about $\frac{1}{16}$ inches to 3 inches), and with some embodiments using a gap chosen from the range of about 1.25 to about 1.75 (such as for lens arrays at less than about 30 LPI).

FIG. 1 illustrates an image display system 100 according to one embodiment of the invention that is useful for providing or delivering digital images or image streams to a user electronic device 110 and for allowing a user 140 of the device to view interlaced portions of such image in proper focus (e.g., by focusing into the display device and not simply upon outer screen surfaces). The user electronic device 110 may take numerous forms to practice the invention with it generally being any device that may be used for generating an image signal 118 that causes a display device 120 to display an image 126 upon a display screen 122. To this end, the user electronic device 110 may include a signal processor 112 that processes signals 114 and/or 116 that provide digital image data including an interlaced image(s) (e.g., a still interlaced image or a video stream with interlaced images).

In some cases, the users of the system 100 may connect over a digital data communications network 150 such as the Internet with a web server (e.g., a search engine provider, a web site of a business, or the like) 152 such as by entering a URL provided as part of a contest (e.g., on a game piece or a decoder that includes a lens array of the invention). For example, the web server 152 may serve up web pages and may implement features of the present invention by operating a game module 154 to access its memory 156 to provide web site information 158 as well as interlaced images 159 in the transmitted image 114. The web server 152 (or web site host) responds to requests for data by client device 110. The data received 114 by client device 110 from the server 152 are accordingly processed and presented in a user interface (not shown separately but may be part of displayed image 126) provided in display device 120. The user electronic device may be a computer system or another electronic device such as a client device that is network-enabled. The device may be a desktop, laptop, notebook, or other computing devices, a Web-enabled or other wireless or cellular phone, a personal digital assistant (PDA), a smart phone, an Internet-enabled or standalone video game device, video game station, or portable gaming devices, a television, a DVD or other disk player, and/or other device used to display images electronically. These client devices enable users to interface with the web server 152, media source 162, and/or cell phone service provider system 172 using various I/O mechanisms, including, but not limited to, keyboard entries voice-activated commands, touch-tone phone interfaces, game controllers, mice, and touch screens.

Some of the functions and features of the invention are described as being performed, in some cases, by mechanism, devices, and modules that may be implemented as software running on a computing device and/or as firmware and/or hardware. For example, the web server 152 may run game/ contest module 154, the entertainment media source 162 may run software, and the cell phone service provider system 172 may run software to process interlaced images using processes or functions described herein, and these processes or functions may be performed by one or more processors or CPUs running software modules or programs. The methods or processes performed by each module is described in detail below typically with reference to flow charts or data/system flow diagrams that highlight the steps that may be performed by subroutines or algorithms when a computer or computing device runs code or programs to implement the functionality of embodiments of the invention. Further, to practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices configured to generate and transmit digital data over a communications network. Data typically is communicated in a wired or wireless manner over digital communications networks such as the Internet, intranets, or the like (which may be represented in some figures simply as connecting lines and/or arrows representing data flow over such networks or more directly between two or more devices or modules) such as in digital format following standard communication and transfer protocols such as TCP/IP protocols. The digital format used for the stored, transferred, and displayed interlaced and other images is not limiting of the invention and may be any formatting technique now in use or implemented in the future. The signal processor 112 may be adapted for providing a user interface in the displayed image 126 including such as, for example, a window or a web page on a web browser of one of the client or user device 110 (e.g., a GUI provided by use of a conventional web browser or similar application including MICROSOFT™ Internet Explorer, Firefox™ from Mozilla, or the like).

Referring again to FIG. 1, the user electronic device 110 includes a display device 120 that may be configured with any of a number of display technologies commonly used (or planned) with electronic devices such as computers, televisions, and handheld devices for displaying digital images based on signals 118. For example, the display device 120 may comprise a color TV screen 112 with a glass face plate 128 using more conventional red, green, and blue (RGB) beams along with a shadow mask and phosphors to create a displayed image 126 on a inner display surface or at a region/location internal 124 to at least an outer surface of the face plate. In the television example, the image signal 118 may be a color TV signal, and the display technology may also include plasma technology, liquid crystal display (LCD), and other television display technology. In such a case, the incoming or received signal may be from a web server 152 (e.g., online/streamed video), an entertainment media source 162 that provides from its memory 164 digital image streams such as movies, television shows, commercials, live feeds and the like with an interlaced image 166 over a distribution system 160 (satellite/dish networks, cable networks, wireless broadcast systems, and the like), and/or from a memory or local device 117 that can play video game cartridges/disks, can play DVDs and other recorded digital information media, and/or the like, with these streams at least at some time including an interlaced image. In other cases, the user electronic device 110 may be a computer or similar device that uses a cathode ray tube (CRT), LCD, or other display technology in the display device 120 to create the displayed image 126 within the display screen 122. In these cases, the image signal 114 is typically received from a communications network 150 from the web server 152 but may also be from the digital entertainment distribution system 160 from media source 162. In yet other cases, the user electronic device 110 includes a wireless device such as a cellular phone or the like that communicates with a cell phone service provider or other such wireless service provider 172 to obtain digital images with interlaced images 176 from its memory 174 or other sources over the communication system 70.

Significantly, the specific configuration of the user electronic device 110 is not a limiting feature of the present invention. The display device 120 may be adapted with CRT, LCD, plasma, color television, or other display technologies to provide a display screen 122 (note, the image signal may be an analog signal for some display technologies such as CRT monitors and the image signal 118 includes such analog signals as well as digital signals used for LCD monitors and many newer televisions). In each of these devices, a face plate or similar component 128 is generally provided that includes an outer surface of the user electronic device (e.g., a planar or arcuate surface on a glass or translucent plastic piece) through which a user or viewer 140 may view the displayed image 126. The displayed image 126 is not presented on this outer surface of the face plate 128, but it is instead provided on some inner display region or surface 124 that is offset some distance, $d_{offset}$, from the outer surface of the face plate 128. The inner display surface or projection surface 124 may be on the backside or inner surface of the face plate 128 or another portion of the display device 120. As discussed herein, the offset distance, $d_{offset}$, often will vary between user electronic devices 110 (as will the screen size and shape) such as between a LCD display screen for a cellular phone and a CRT display screen for a desktop computer and also between a color television and a portable DVD player with a flat screen. The offset distance, typically is not very large such as less than about 6 inches and more typically less than about 3 inches, but it can vary from about up to about 1/16 inch to about 3 inches or more. As discussed above, lenticular lens arrays in the past could not even focus well on an image that was 1/16 inch away from the lens array let alone one that was inches away. Further, a lens array adapted for a display device with an offset, $d_{offset}$, of about 1/16 inch may not be useful for a device 120 with a differing offset, $d_{offset}$, such as 1/8 inch or more.

To address the focusing problems associated with the offset (and variable offset), the system 100 includes a lens assembly 130 with a mounting mechanism 132 shown generally attached or near the display device 120 (e.g., mounted onto a body (not shown) of the user electronic device or of a monitor device including the display device 120). The assembly 130 further includes a lens array 134 that may be positioned manually by the viewer 140 or be supported and positioned relative to the outer surface of the face plate 128 (or display screen 122) with the mounting mechanism 132. For example, the lens array 134 may be a lenticular lens array or sheet of lenticular material that is applied directly to the face plate 128 to be over or adjacent the displayed image 126 (such as when the lens array 134 is fabricated specifically for the known offset, $d_{offset}$, of a particular display device 120 such as a lens array that focuses about 3/8 inch behind its back surface when the offset distance, $d_{offset}$, is also about 3/8 inches or the like).

In other cases, the mounting mechanism 132 is adapted with a frame or other receiving portion for receiving and physically retaining the array 134 and then for providing a focusing spacing or gap (or air gap) 135 with a desired thickness, $t_{gap}$. The mounting mechanism 132 may include components or means for adjusting or changing the gap, $t_{gap}$, with the movement toward and/or away from the face plate 128 shown with arrow 137. This allows the lens array 134 to be designed with a lenticules or lenses with a particular focal length (or to provide a focus plane or region at some distance from the planar or opposite back surface of the lens array 134) to be used with more than one display device 120. For example, the lens array 134 may be formed to focus about 1 inch behind the lens array. In this case, the lens array 134 may be useful with display devices 120 that have display screens 122 with an offset, $d_{offset}$, of up to about 1 inch, and the size, $t_{gap}$, of the focusing or air gap 135 would be adjusted 137 (such as by pivoting the array 134, sliding the array 134 in grooves or slots, or the like depending on the configuration of mechanism 132) until the back surface of the lens array 134 was about the focal length away from the displayed image 126 and/or the inner display region or surface 124 (e.g., until the focus plane of the array 134 coincides or nearly coincides with the inner display surface 124 or location of the image 126 within the display device 120).

The lens arrays of the present invention generally are formed using many conventional and well known techniques for producing lenticular material or arrays of lenticules or elongate lenses. Hence, it is not necessary to provide detailed explanation how the lens arrays are manufactured (except, as discussed below, to explain how the lens arrays are adapted to focus at a focal length that is significantly greater than the thickness of the lens array or substrate). However, as brief background, lenticular devices have been used for many years to provide elaborate graphics. This demand is due in part to the need for the retailers to separate their products from other products, and one effective technique is to enhance shelf appeal by including eye-catching imagery such as animation or a three-dimensional (3D) effect. For example, water bottles are presently sold with wrap-around labels that display images, and gift cards are sold at a large majority of retail stores that include animation or 3D images. Such imagery can be provided by using lenticular graphic labels to provide three-dimensional (3D) and animated imagery such as a short clip of a movie. Leticular lens material is used in the packaging industry for creating promotional material with appealing graphics and typically involves producing a sheet of lenticular lens material, applying an image to the lens material, and adhesively attaching the lenticular lens material to a separately produced object for display.

In general, the production of lenticular devices such as gift cards and labels includes selecting a number of images (or frames) such as sequential portions of a movie or animated clip to use to create a desired visual effect. Each of these images are sliced into a predefined number of slices or interlaces (such as 10 to 30 or more slices per image), and the slices of each image are interlaced to form an interlaced image made up of a large number of image sets or sets of interlaces. Lenticular lenses or lens sheets are then mapped to the interlaced image, and the lenticular lenses are fabricated according to this mapping such that each lenticular lens is paired with (or covers) one of the sets of interlaces. The lenticular material or lens sheet generally includes a transparent web that has a flat side or layer and a side with optical ridges and grooves formed by linear or elongated lenticules (i.e., lenses) arranged side-by-side with the lenticules or optical ridges extending parallel to each other over the length of the transparent web. To provide the unique visual effects in conventional lenticular devices, ink (e.g., four color ink) is applied to or printed directly on the flat side of the transparent web to form a thin ink layer or the image layer containing the sets of interlaces or image slices, which is then viewable through the transparent web of optical ridges.

Each lenticule or lens of the lenticular layer is paired or mapped to a fairly large set or number of the interlaced image slices or elements. For example, one lenticule may be paired with up to 10 to 30 or more interlaced image slices or interlaces depending on images (or frames of a movie clip or the like is used), and generally only one of the slices or interlaces is visible through the lenticule at a time based on the position of the lenticule relative to a viewer's eye. In other words, the animation, 3D, or other graphic effect is achieved by moving the lenticule or the viewer's position to sequentially view each of the interlaced image slices under the lenticule and allow a viewer to see each of the images or frames in the interlaced image or ink layer by combining the slices or interlaces viewed from all the lenticules. The frequency or coarseness of the lens array and corresponding interlaced image are matched or paired, and the lenticular material is typically described as having a particular frequency in lenticules per inch (LPI), with common material ranging from about 10 to 30 LPI (e.g., relatively thick lens substrates or sheets) up 40 to 70 or more LPI (e.g., thinner lenticular sheets).

With his general background in mind and ways of producing lens arrays understood, it may now be useful to describe a design example for fabricating or providing a lenticular lens array with adapted for focusing beyond its back plane or surface and into a display screen. As discussed previously, the frequency of the lenticular lens array is preferably selected to match the displayed image and may be up to 30 LPI or much finer. Also, the focal length (which may be measured to include the array substrate or from the back planar surface of such substrate for ease) is typically selected to suit the expected location of the inner display surface in the display screen, e.g., to suit an expected range of offset depths, $d_{offset}$, with a useful range being up to 6 inches or more and a more typical range being 0 to 3 inches. Some embodiments utilize a focal length of about 1 to about 2 inches to provide a relatively universal lens array. In the following example, the focal length chosen was about 2 inches as measured from the rear or back surface of the lens array, across the focusing gap or air gap, and into or across the offset of the display screen (e.g., the lens array described may readily be used with display devices having a offset depth of up to and including about 2 inches).

Figure 2:
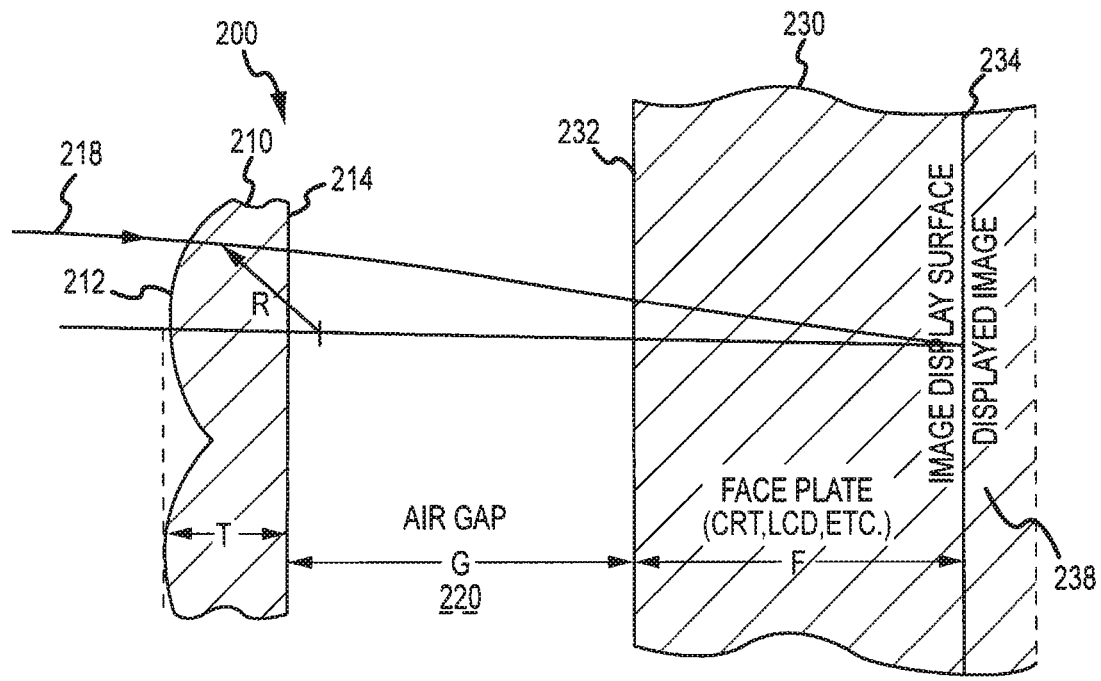
FIG. 2 illustrates a partial sectional view of a lens array positioned adjacent a face plate of a display screen with a focusing or air gap provided between the array and the face plate, with a ray tracing provided in the view.

FIG. 2 illustrates a portion of an image display system 200 of an embodiment of the invention. As shown, a lens array or substrate 210 is provided with a first surface with a plurality of lenticules or elongate lenses 212 and a second or backside surface 214 opposite these lenses. As part of a display device or, more specifically, as part of a display screen, a face plate 230 is provided with an outer surface 232 proximate to the second or backside surface 214 of the lens array 210 but spaced apart a focusing or air gap 220. The face plate 230 may be sheet of glass, plastic, ceramic, or other transparent to translucent material such as may be provided in a display screen of a CRT, LCD, or other monitor/display device (not shown). In this example, the inner display surface 234 is provided on the inner surface of the face plate 230 and a displayed image 238 is shown to be provided or projected onto this surface 234 (but, in other cases, the inner display surface may be further into the display screen or at another location).

As discussed above, it is typically desirable for the lens array 210 to be designed to focus at some point beyond or behind the surface 214 of the lens array so as to focus into the face plate 230 onto the inner display surface 234 (and coinciding display image with an interlaced image 238). If the offset between the outer surface 232 and the inner display surface 234 (here shown as the back side of the face plate 230) are known, the lens array 210 may be designed with a focal length that causes it to focus through the array 210 and through the face plate 230 (e.g., with the array mounted directly onto the face plate surface 232). More typically, the lens array 210 is fabricated for use with more than one display screen and/or face plate 230, and, hence, the lens array 210 is designed with a focal length behind or spaced apart from the back surface 214 and greater than the expected offset between surfaces 232, 234. The air gap 220 is then varied or modified to achieve focusing by causing the focus point of the lenses 212 to fall upon the inner display surface 234 and image 238.

FIG. 2 along with FIGS. 3-6 are reference in conjunction with equations to explain a ray tracing to verify a lens array design. The figures and following equations provide basic mathematical analysis or support for a ray tracing shown with ray 218 through a lenticular structure or array 210, through an air gap 220, and through a faceplate (e.g., a CRT faceplate, an LCD face, a plasma screen faceplate or the like) to a image or image source 238 (e.g., to a inner display surface 234). In designing a lens array 210, the radius, R, is chosen and it would be helpful to be able to provide a simple equation allows computation of a radius value such as when the air gap, G, and panel thickness, F, are assumed or known. However, it is analytically very difficult to generate such as solution. Hence, the inventors have typically used a computer program to calculate or process the problem as follows: a radius, R, is chosen and dimensions of the other parameters are entered into the following equations/formulas. Equation 17 below provides the face plate thickness or offset depth, F, and if this calculated value meets the expected offset for a faceplate the radius chosen may be used to manufacture the lenticules in a lens array. If not, a differing value for the radius, R, is chosen and the process is repeated iteratively to obtain an offset value, F, that is closer to the expected or desired value. In other embodiments, a commercially available leis design program is used to more directly calculate an optimized radius, R, for the lenses 212 of the lens array 210 with the other parameters input as required by the particular design program.

With reference to FIGS. 2-6 and the following equations that can be followed in stepwise fashion to perform the analysis, the following values or parameters are assumed (with the values such as thicknesses and the radius provided in inches): Radius, R, of 0.93 inches; Thickness, T, of 0.03 inches; Air gap, G, of 1.70 inches; Focal Point in Display media, F, of 0.3 inches; Index of Refraction of Lenticular, $n_1$=1.49; Index of Refraction of Face Panel, $n_4$=1.60; Pitch (constant), of 0.05 (but, note, the pitch does not enter directly in the design for small lenticule widths and large focal lengths, but typically a value would be, but not limited to 0.05 or the like); and Pitch (variable, e.g., in the case of a variable pitch as discussed below the range may be provided as follows), in the range of about 0.01 to 0.15.

Figure 3:
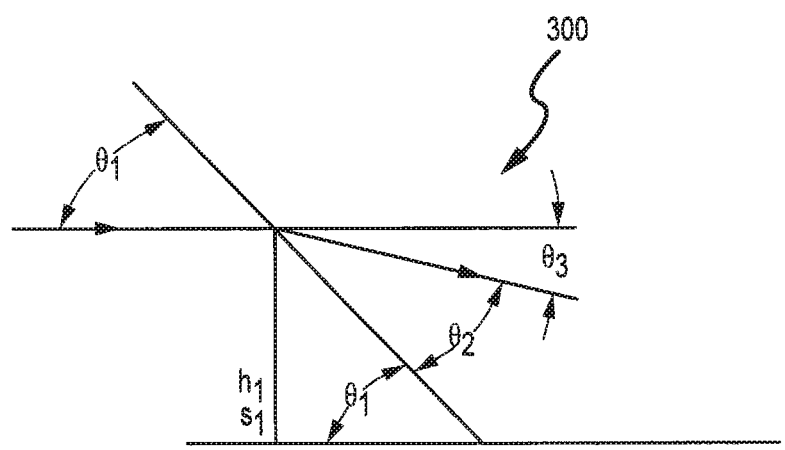
FIGS. 3-6 are a set of general geometry figures for use with the view of FIG. 2 in performing a ray tracing analysis of a lens array configuration or design for use with one or more display devices.

In FIG. 3 a detail graph 300 is provided of the refraction at the cylindrical surface of the lenticule 212 with R being the radius of the lenticular cylinder, $\theta_1$ being the angle of incidence, and $\theta_2$ being the angle of refraction.

$$\frac{h_1}{R} = \tan\theta_1 \quad \text{Eq. 1}$$

$$\theta_1 = \tan^{-1}\left[\frac{h_1}{R}\right] \quad \text{Eq. 2}$$

Applying Snell's Law:

$$n_1 \sin\theta_1 = n_2 \sin\theta_2 \quad \text{Eq. 3}$$

$$\theta_2 = \sin^{-1}\left[\frac{n_1}{n_2}\sin\theta_1\right] \quad \text{Eq. 4}$$

$$S_1 = R - \sqrt{(R^2 - h_1^2)} \quad \text{Eq. 5}$$

$$\theta_3 = \theta_1 - \theta_2 \quad \text{Eq. 6}$$

Figure 4:
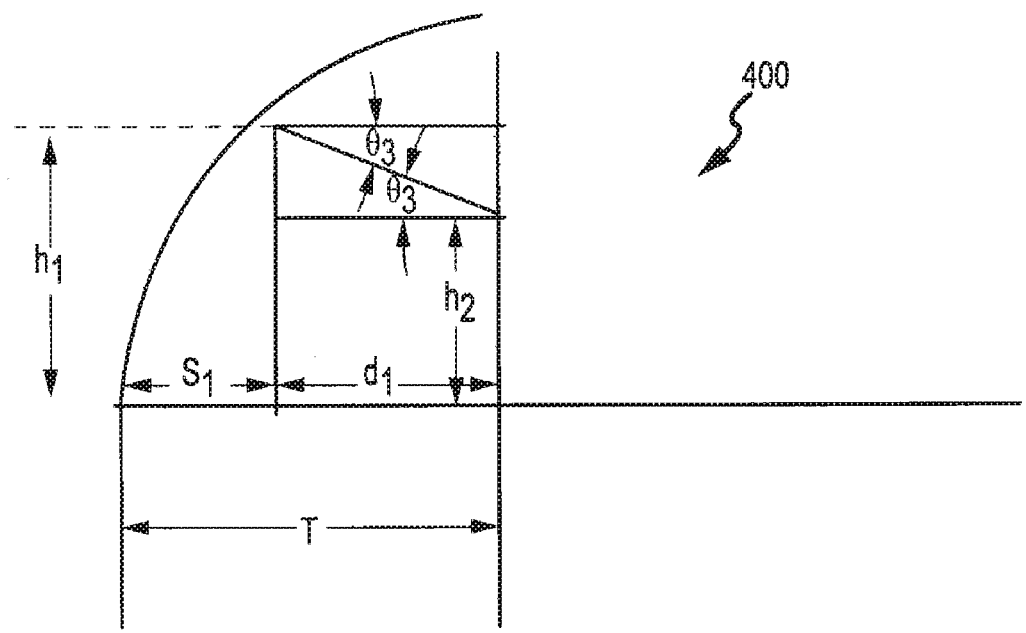

Now, with reference to FIG. 4 and the graph of the intersection of the base of the lenticular (e.g., lenticule 212 of lens array 210 shown in FIG. 2):

$$d_1 = T - S_1 \quad \text{Eq. 7}$$

$$\frac{h_1 - h_2}{d_1} = \tan\theta_3 \quad \text{Eq. 8}$$

$$h_2 = h_1 - d_1 \tan\theta_3 \quad \text{Eq. 9}$$

Now, looking at refraction at base of the lenticular (e.g., lens 212 of lens array 210 of FIG. 2):

$$n_2 \sin\theta_3 = n_3 \sin\theta_4 \quad \text{Eq. 10}$$

$$\text{with } n_2 = 1.49 \text{ and } n_3 = 1.00: \quad \text{Eq. 11}$$

$$\theta_4 = \sin^{-1}\left[\frac{n_2}{n_3}\sin\theta_3\right]$$

Figure 5:
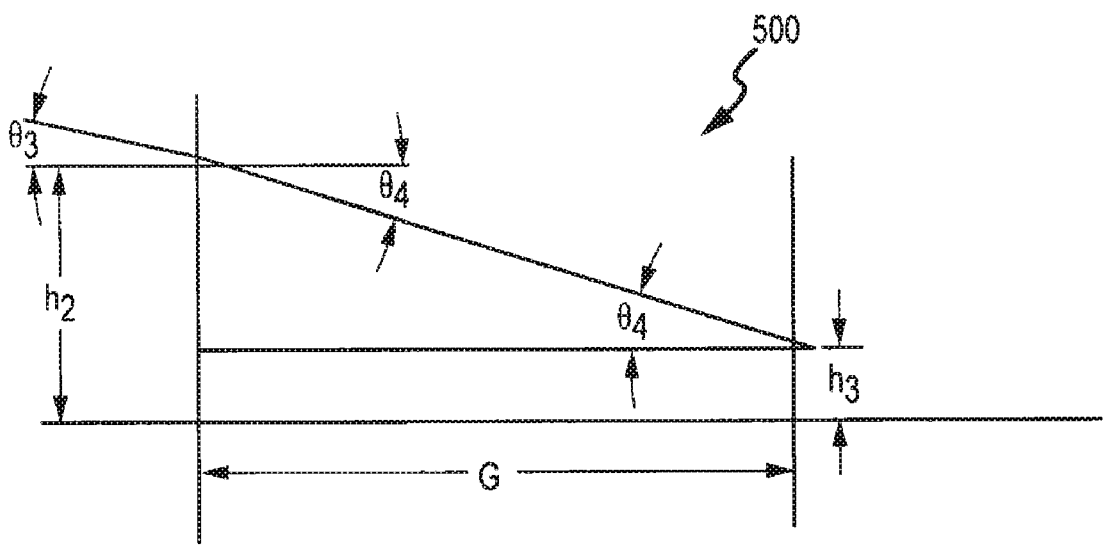

With reference to the graph 500 of FIG. 5:

$$\frac{h_2 - h_3}{G} = \tan\theta_4 \quad \text{Eq. 12}$$

$$h_3 = h_2 - G\tan\theta_4 \quad \text{Eq. 13}$$

Figure 6:
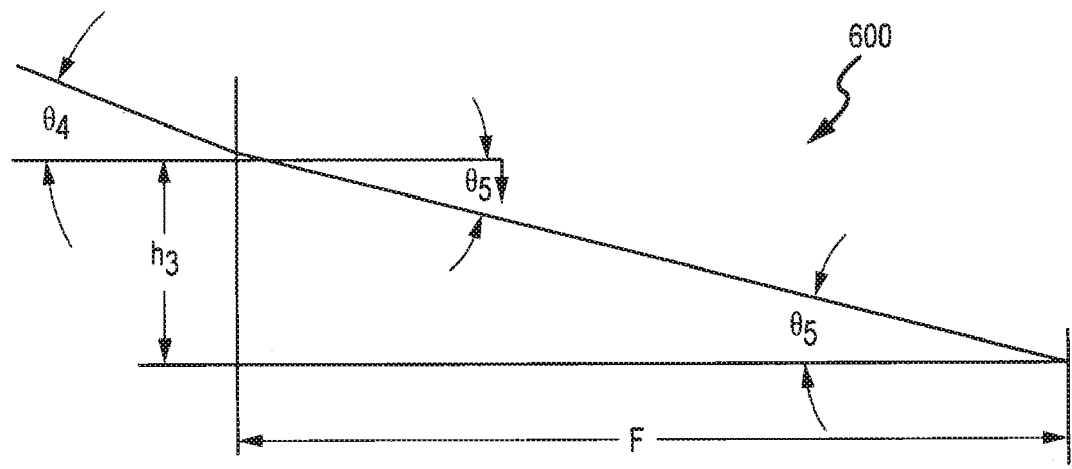

With reference to the graph 600 of FIG. 6 and considering refraction into the display screen (e.g., into a faceplate 230 as may be provided for a CRT, LCD, Plasma or other display device):

$$n_3 \sin\theta_4 = n_4 \sin\theta_5 \quad \text{Eq. 14}$$

$$\text{with } n_3 = 1 \text{ and } n_4 = 1.6 \text{ (for example)}: \quad \text{Eq. 15}$$

$$\theta_5 = \sin^{-1}\left[\frac{n_3}{n_4}\sin\theta_4\right]$$

Now, traversing the faceplate glass (e.g., faceplate 230 such as CRT glass, LCD, Plasma or the like) to the inner display surface and its received or displayed image with interlaced image portion:

$$\frac{h_3}{F} = \tan\theta_5 \quad \text{Eq. 16}$$

$$F = \frac{h_3}{\tan\theta_5} \quad \text{Eq. 17}$$

Figure 7:
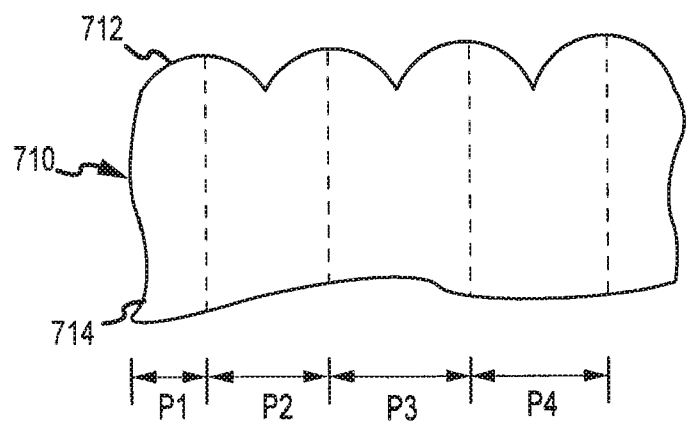
FIG. 7 illustrates a partial sectional view of a lenticular sheet or lens array of one embodiment of the invention utilizing two or more pitches across the lens array (rather than a conventional constant pitch)

In addition to utilizing a lenticules or lens arrays with "long" focal lengths, the lens arrays of the invention may also make use of other unique functionalities and configurations to provide a desired effect. FIG. 7, for example, illustrates a lens substrate 710 that may be used in or as a lens array of the present invention to focus within a display device. Significantly, the lens array 710 includes a plurality of lenticules or parallel, elongate lenses 712 extending across a first surface of the substrate or array 710 and an opposite side, which typically is planar, 714. A conventional lens array has a constant pitch across its surface as measured between centers of adjacent lenses or lenticules. In contrast, the lens array 710 is shown to include four pitches, $P_1$ to $P_4$, and at least two of these differ with some embodiments calling for each pitch to differ from the other pitches. This pattern may be repeated across the lens array such as with sets of lenticules with this repeating pitch pattern. In other cases, a set of lenticules may be provided with a first pitch and then a second set may have a different pitch and so on. In practice, the radii of the lenticules 712 typically will be equal so as to provide a relatively constant focal length for the lens array (e.g., to focus the lens array on an inner display surface that typically is provided at a single distance from the surface 714), but different chord lengths are provided and would be assigned to or correspond to the various pitches.

Figure 8:
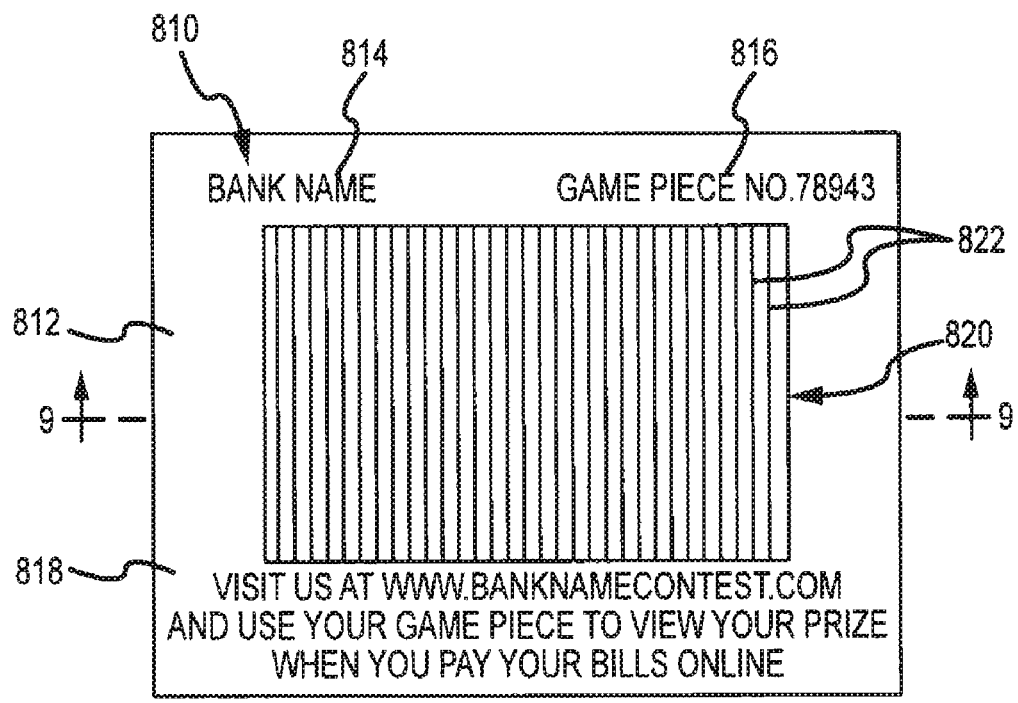
FIG. 8 illustrates a game or contest piece (e.g., lens assembly) with a lens array according to an embodiment of the invention.
Figure 9:
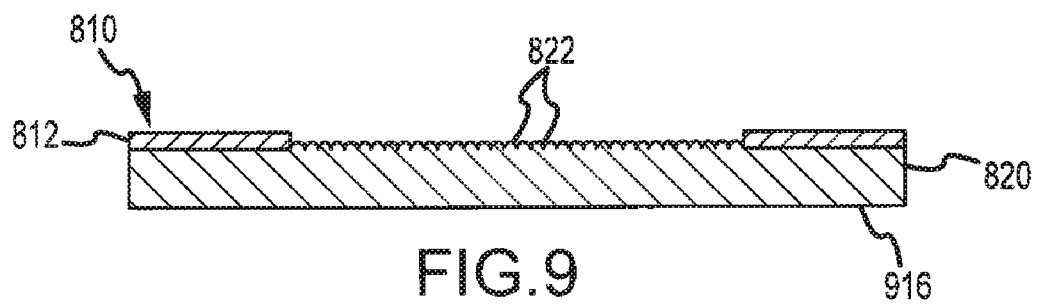
FIG. 9 is a sectional view of the game piece of FIG. 8 taken at line 9-9.

In some cases, the image display systems of the invention may be used as part of marketing or promotion campaigns or methods. As such, a lens array with a "long" focal length may be distributed to game contestants (e.g., customers or potential customers of an entity), and these contestants or users/viewers would use the lens arrays along with an electronic display device (such as a cell phone, a computing device, a television, or the like) to view a display image that includes an electronic version of an interlaced image, e.g., to determine if they are a winner of an contest or game. With this in mind, FIGS. 8 and 9 illustrate one embodiment of a game piece (e.g., a lens assembly) 810 that includes a lens array 820 with a plurality of lenticules 822 on a first surface and a second opposite planar surface 926. The lens array 820 may be fabricates as discussed with reference to FIGS. 2-7 with a focus length that is "long" in the fact that it does not coincide with the surface 926 but is instead spaced apart some distance (such as 1/16 to 3 inches) or more beyond the surface 926 or through the material of the array 820. Otherwise, the lens array 820 may be manufactured as is well understood by the industry for lenticular material or lenticular sheets such as with a LPI of 10 to 30 or more fine of a transparent or translucent plastic material such as a polyethylene or the like.

The game piece 810 further includes a label or border 812 that may simply be a layer of ink printed upon a planar, boundary portion of the array 820. Alternatively, the label 812 may be a paper, plastic, or other material layer or sheet that is applied to the lens array 820 such as with adhesive or the like. The label 812 is provided in the game piece 810 to contain or present a set of data as part of the promotion or marketing campaign or process, e.g., to drive or encourage customer or others to a web site or to watch a television show or the like and to take certain actions while there or while viewing an image. For example, as shown, the label 812 includes a name of the entity 814 providing the card and/or presenting the contest as well as information useful for identifying the game piece (or the customer) at 816 such as a serial number of the piece 810. Additionally the label 812 includes data providing information on where to view an image with the lens array 820 and its lenses 822 that provide a unique focusing ability. In this case, the game piece 810 is designed for use with an image that will be displayed at a particular web site (with the site's address being provided at 818). In other cases, the data 818 may instruct the holder of the piece 810 to used the lens array during a particular television show, during a commercial, to view a portion of video game, or the like to view an interlaced image to be displayed in these images (or image streams). The data at 818 may also encourage a holder of the game piece to take certain desired actions such as to pay their bills online, to visit a linking site, to view an image with the included lens array 820, or the like. The lens array 820 may be relatively thin such as less that about 3/8 inches and more typically less about 1/8 inches such as about the thickness of a conventional credit, debit, or similar card.

Figure 10:
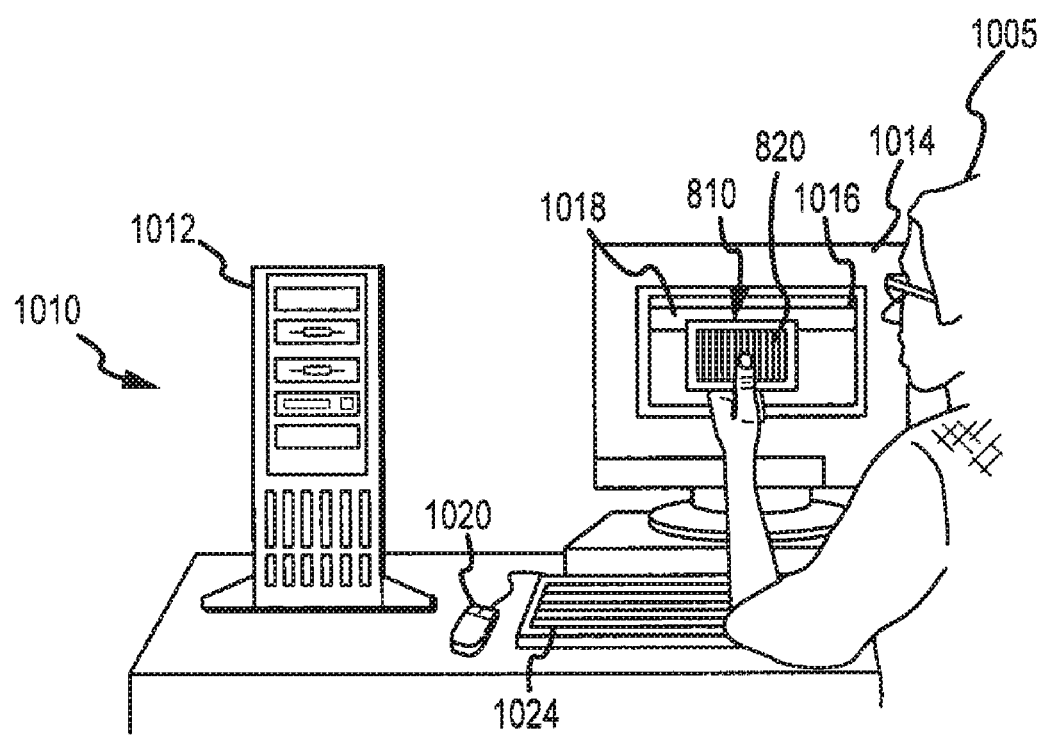
FIG. 10 illustrates operation of portions of an image display assembly (e.g., such as may be integrated into an implementation of the system of FIG. 1) during operation of a user/viewer of a client electronic device and game piece (such as shown in FIGS. 8 and 9) to view a displayed image with an interlaced image.

FIG. 10 illustrates a portion of an image display system being operated by a user or viewer 1005. In this example, a user or holder 1005 of the game piece 810 is positioning the piece 810 proximate to a display screen 1016 of a display device or monitor 1014 of a computer system 1012. The computer system or client device 1010 further includes a computer (e.g., processor, 110 devices, network connectivity, memory, and/or media drives and the like) 1012 that may be linked to a network such as the Internet so as to allow the user 1005 to access a web site with associated with or identified on the game piece 810. This may be achieved with use of input devices 1020, 1024 or other conventional techniques to request a particular web site (such as entering a URI in a web browser or similar application run by computer 1012).

In this example, the user 1005 is manually positioning the game piece 810 adjacent the screen 1016 and typically about parallel to the outer surface of the display screen or face plate 1016 of the monitor or display device 1014. During operation, the computer system 1010 is operated to cause an image to be displayed upon the display device 1014, and the user 1005 positions the game piece 810 such that the lens array 820 covers or is adjacent an interlaced image portion 1018 of the displayed image on the screen 1016. The user 1005, in this case, may manually position the game piece 810 to adjust the air or focusing gap between the back of the lens array 820 and the outer surface of the face plate 1016 until a desired level of focus is achieved. This may involve the user 1005 first pressing the lens array 820 against the screen 1016 and then pulling it away to increase the gap until the image 1018 is clearly viewable by user 1005 (or vice versa by starting with a large gap and moving toward the screen 1016). In some embodiments, the lens array 820 is selected with a focal length (as may be measure from the planar back surface in some case or to include the thickness of the lens array in other cases) that is great enough to focus into the screen 1016, e.g., 1/16 to 3 inches or the like with some embodiments using a very long focal length for the array such as up to 3 inches or more with others using a smaller focal length such as 2 inches or less (such as about 1.5 inches). Hence, these game pieces 810 with such focal lengths would be "universal" or useful with a range of offset depths (such as ones that are less than about the focal length of the array 820 or less than the focal length minus the thickness of the array 820). In other embodiments, the game piece 810 may be fit into a mounting mechanism (not shown in FIG. 10) that may be attached to or provided near the display device 1014 to support the lens array 820 near the image 1018 and allow the user 1005 to move the array 810 to set the air or focusing gap (e.g., to focus the lens array).

Figure 11:
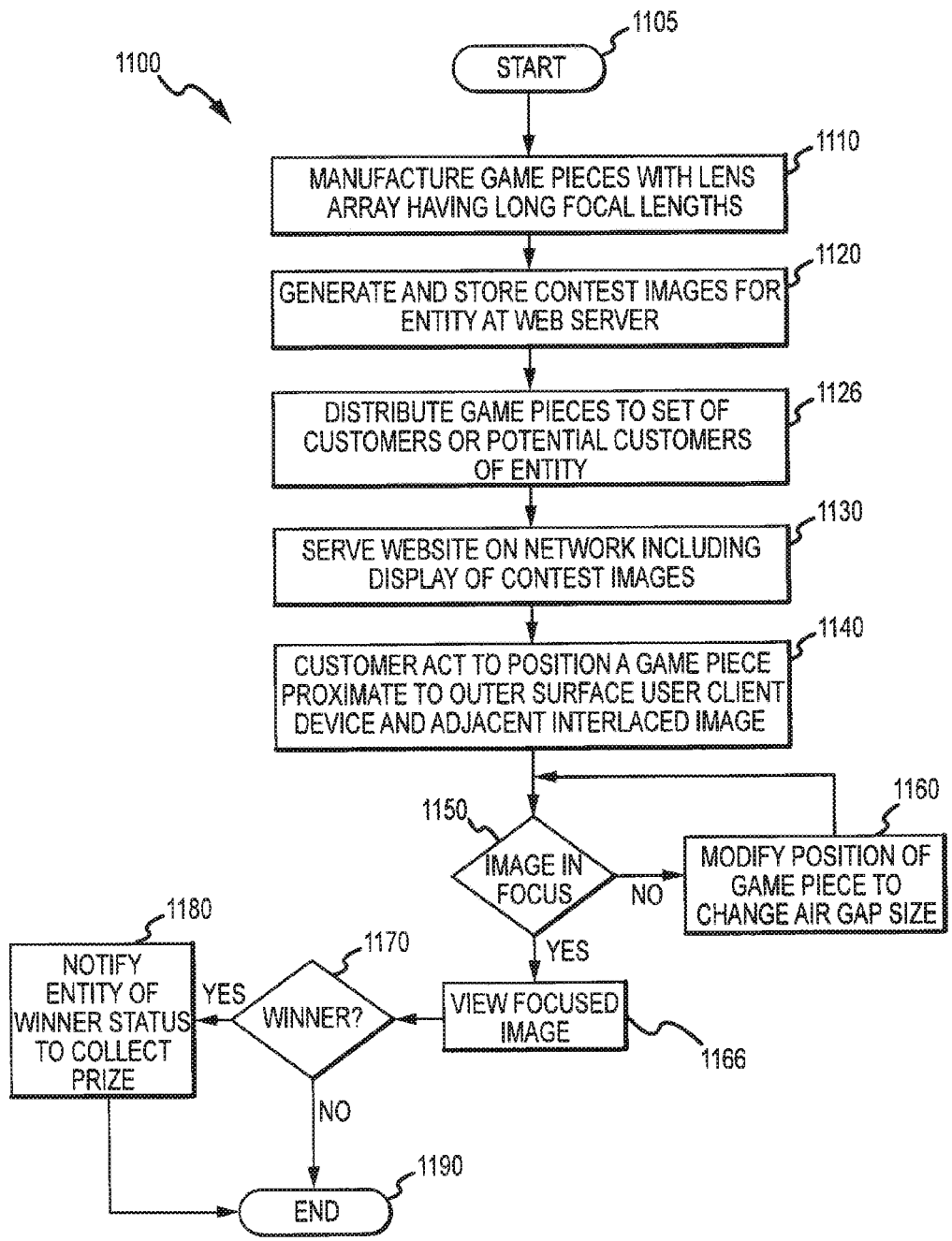
FIG. 11 is a flow chart of a method of running a promotion or marketing campaign including operation of an image display system of the present invention (such as the systems shown in FIG. 1 and/or FIG. 10)

FIG. 11 illustrates an exemplary method 1100 of using lens arrays of the present invention within a marketing or promotion campaign. As shown, the method 1100 starts at 1105 such as by an entity (or business) designing a marketing campaign such as one that involves an online contest that can be operated via a web site. For example, the online contest may call for contestants to visit a web site and with or without taking some additional action viewing a displayed image/code to see if they are a winner of a particular prize (e.g., a prize associated with the displayed image/code). The additional action may be to require the visiting person to pay a bill online (rather than using a check), to enter demographic and/or contact information or other date desired by the entity, or to solve a puzzle or the like. Upon taking the additional action, the web site may then operate to display the image with the interlace image or portion. The interlaced image may be randomly or selected or selected based on some protocol/algorithm from a set of such images (e.g., to establish a desired percentage of winners or of winners of a particular type/prize), and in some cases the images may be selected from differing image sets depending upon the additional actions taken by the visiting contestant (or their failure to take such action).

After the online game is designed, the method 1100 continues at 1110 with manufacturing game pieces with a lens array having a "long" focal length. At 1120, the method 1100 includes generating and storing contest images for the entity and its online game/contest such as at a web server or in storage accessible by a web server or other device hosting the online game (or the entities web site). The lens array and image are created to be used together, e.g., with a particular frequency or LPI. Also, the size and shape of the lens array and image are typically selected to substantially coincide (e.g., both are 3 inch by 3 inch squares, both are circular shapes with a particular radius, and the like). In some embodiments, though, an additional step in the method 1100 involves the web server sizing (and/or shaping) the stored contest image prior to serving or transmitting the image, and such sizing (and/or shaping) may be done to match a particular lens array or to suit a particular display screen of a user device.

The method 1100 continues at 1126 with distributing the game pieces to a set of customer or potential customers of the entity. This may be done with attachments or inserts to newspapers or magazines, with special purpose mailings, with mailings of invoices or bills (e.g., an invoice or bill may provide the game piece and ask the recipient to visit a web site to pay their bill online), by direct delivery such as a giveaway at a store or at an event, and in other ways. At 1130, the web server operates to serve the web site via a network such as the Internet, and this serving may include responding to requests for a web site from the set of customers from step 1126. The serving of the web page or site typically also includes, at some point, displaying an image including the contest images (and an interlaced image viewable with the lens array). At 1140, the customer acts to position a game piece proximate to an outer surface of a client or user electronic device (such as their computer, a cell phone, a PDA, or the like), and user may do this manually or through the use of mounting mechanism attached to their electronic device.

The game piece typically is positioned at a first air gap. At 1150, the user determines whether the image is in focus with the lens array in the first air gap position (space apart a particular distance or abutting the outer surface of the display screen or faceplate). If not in focus, the user at 1160 modifies the position of the game piece to change the air gap size to a second, third, fourth, etc air gap by moving the piece manually or operating a mounting mechanism to alter the air gap, and this is repeated until the image is in focus. At 1166, the displayed and now in focus image is viewed at 1166 and at 1170 the user/viewer determines whether they are a winner. If not, the method 1100 ends at 1190. If a winner, the user acts at 1180 to notify the entity (or contest operator) of their winner status to collect or request their prize. A winner may be indicated in many ways and is not limiting of the invention.

In some embodiments, the interlaced image displayed via a user's electronic device is an incomplete image or partial image. In such cases, the lens array may further include a complimentary or completing image that when paired with the incomplete image displayed on the electronic device produces a complete image or a combined image that appears whole (e.g., the lens array may include a portion of the interlaced image). The image of the lens array may be printed on either side of the lens array. In some embodiments, a complimentary image is provided on the lens array so as to identify a game piece as a winner of a contest, and in this way, the displayed image may be the same for all viewers with the game piece and its included lens array being indicative of a winner with a completed image (such as a completed code or statement that "You Win! Contact the Entity to claim your prize."). In some cases, the lens array may be provides as part of or as detachable add on to a retail product. For example, a lens array may be provided as part of a label and the viewer can place the label near a display screen to view an image such as one displayed as part of a television or online commercial.

Figure 12:
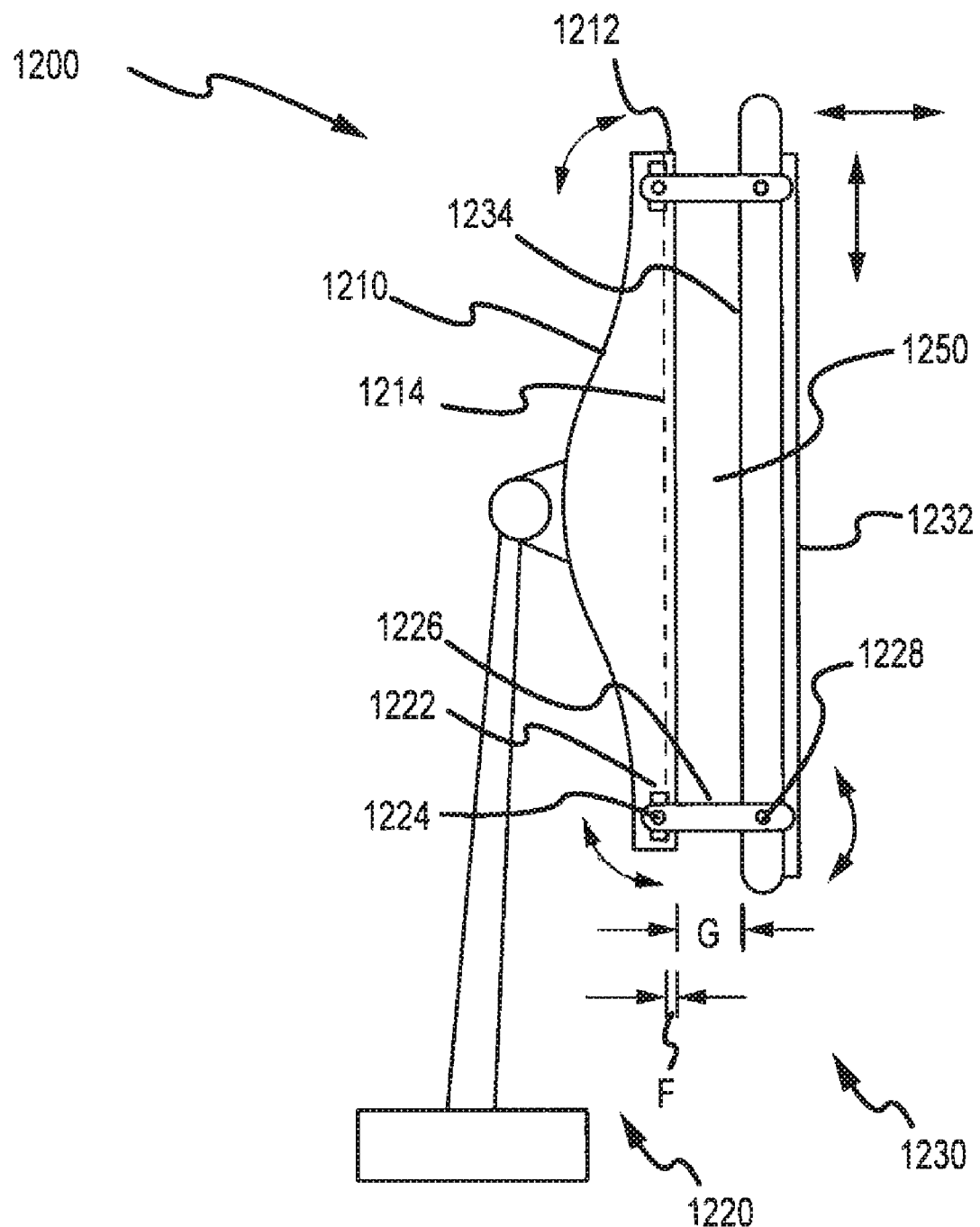
FIG. 12 illustrates a portion of an image display system of the invention illustrating a pivotable mounting mechanism for positionably mounting a lens array on a computer monitor such as a CRT monitor.

FIG. 12 illustrates a partial image display system 1200 including a display device or monitor 1210 such as may be included in a computer system. The monitor 1210 includes a display screen 1212 such as, but not limited to, a CRT screen, and during use of the monitor for displaying an image with an interlaced image portion (as described above), the displayed image typically is present or provided on an inner display surface 1214 that is offset some distance, F, from the outer surface of the screen 1212. As a result, the system 1200 preferably includes a mounting mechanism 1220 and a lens array 1230 (or lens assembly). The lens array 1230 includes a plurality of lenticules or lenses 1232 on a first surface distal to the screen 1212 and an inner or second surface proximate to the screen 1212 that typically is planar (e.g., a part of the lens array substrate material). The lens array 1230 is configured as discussed above to have a long focal length causing the lenticules 1232 to focus at a point or plane beyond the back surface 1234 of the array 1230.

The mounting mechanism 1220 is adapted for supporting the lens array 1230 and also for varying the position of the lens array 1230 relative to the screen 1212 (or the outer surface of the screen 1212) as shown in FIG. 12. The mounting mechanism 1220 illustrated achieves this function by including attachment elements 1222 that attach the mechanism 1220 to the housing of the monitor 1210 (such as with adhesive or with Velcro or similar devices). The mounting mechanism 1220 further includes arms 1226 attached to the attachment elements 1222 and to the lens array 1230 via pins 1224, 1228 such that the arms 1226 and the array 1230 may pivot as shown to maintain the array 1230 substantially parallel to the screen 1212 while also altering the size or thickness, G, of the air or focusing gap 1250. In this manner, a user of the system 1200 may move the lens array 1230 relative to the outer surface of the display screen 1212 until the displayed image is in focus such as when the focus plane or focal length of the lenses 1232 aligns or coincides substantially with the inner display surface 1214 of the display device or monitor 1210. This may occur wherein the lens array surface 1234 abuts the screen 1212 (e.g., G is zero) but more typically will occur with there being an air gap 1250 between the surface 1234 and the outer surface of screen 1212 (e.g., with G being greater than zero such as up to 3 inches or more but less than the focal length of the lens array 1230 otherwise proper focusing typically cannot be achieved).

Figure 13:
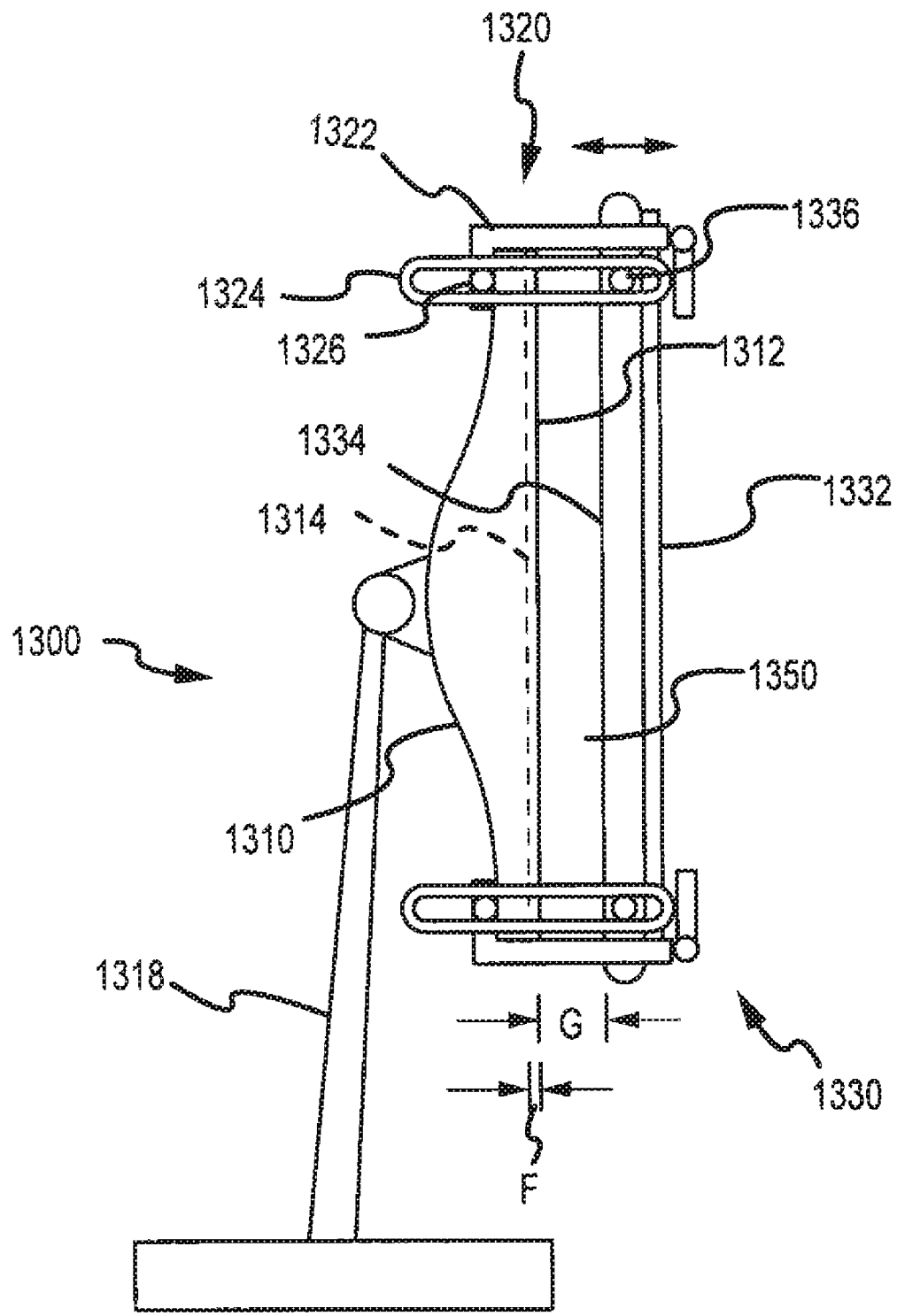
FIG. 13 illustrates a portion of an image display system of the invention similar to that shown in FIG. 12 with a lens array positionably mounted on a display, e.g., for a computer or a television using flat screen, LCD, plasma or similar display technologies, with a slidable mounting mechanism to adjust the air or focusing gap.

FIG. 13 illustrates a partial image display system 1300 similar to that of FIG. 12 but in this case a differing display device and a differing mounting mechanism is utilized to provide similar functionality (e.g., to allow focusing of a lens array by changing air gap size). The display device 1310 may be a flat screen monitor such as may be provided with LCD, plasma, or other technologies for use with computer systems, television systems, DVD players, and other electronic devices. The display device 1310 includes a display screen 1312 with an exposed outer surface and a stand 1318 is used to support device 1310. When in use (e.g., to display an image with an interlaced portion based on a image signal), the displayed image is provided on an inner display surface 1314 again that is offset some distance, F, from the outer surface of display screen 1312. The system 1300 further includes a lens array 1330 with a planar surface 1334 proximate to the screen 1312 but typically spaced apart some distance, G, to provide a focusing or air gap 1350 between the lens array 1330 and the screen 1312. The lens array 1330 also includes a plurality of lenticules or lenses 1332 designed to focus into the screen 1312 and onto the display surface 1314 (e.g., a focal length greater than the thickness of the lens array 1330 to focus behind surface 1334).

A mounting mechanism 1320 is provided to adjust the size of the air gap 1350, and in this case this is achieved by providing a mounting arm(s) 1322 that is attached to or resting upon the housing of display 1310 and that integrally includes or supports a separate slot element 1324. The lens array 1330 is then supported by pin 1336 that is fit into the groove or slot 1326 of element 1324. To set the gap 1350 size or thickness, G, and focus the lens array 1330 onto the inner display surface 1314 the lens array 1330 may simply be pushed inward or pulled outward relative to the display screen 1312 of display device 1310.

Figure 14:
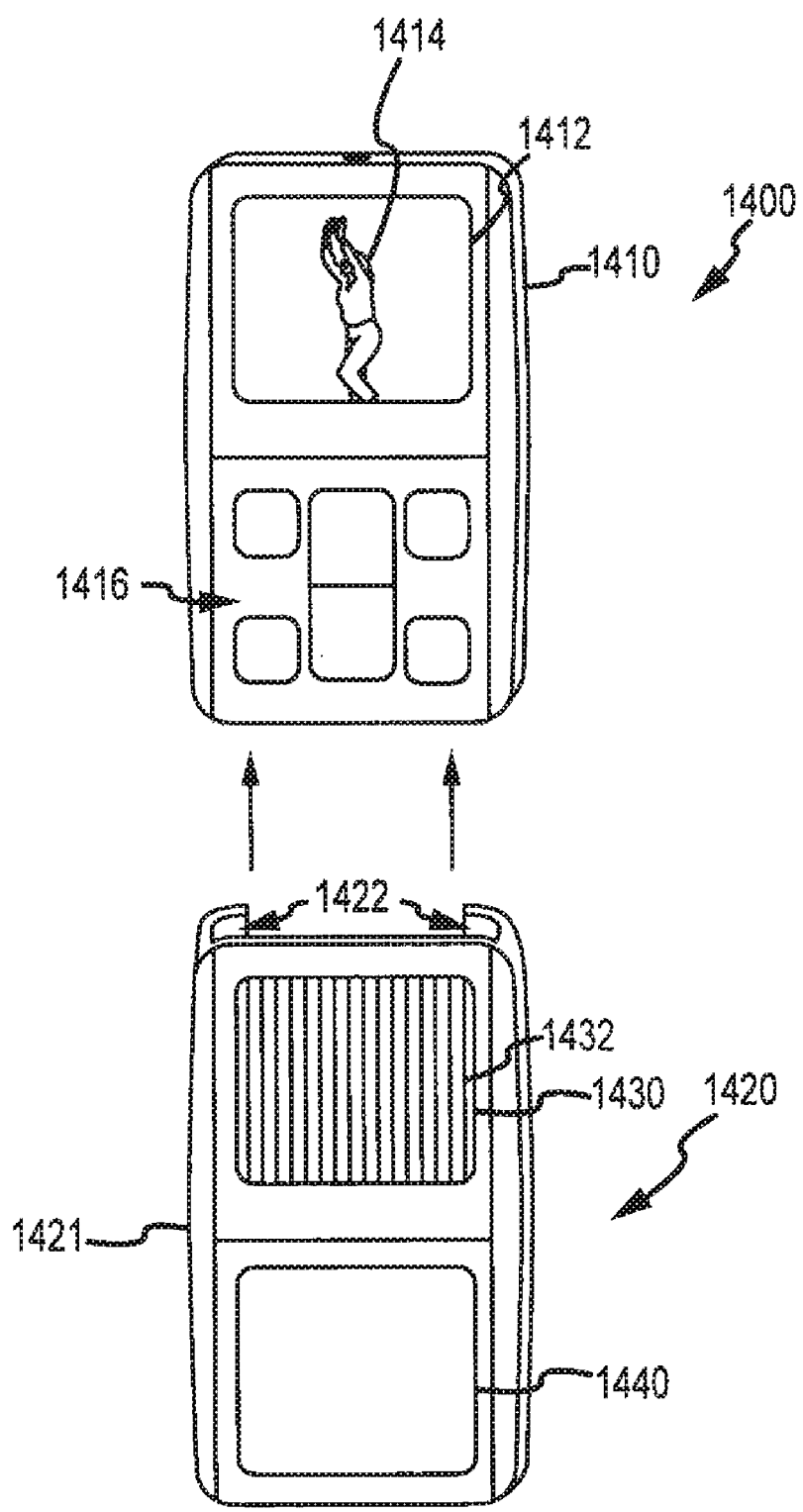

FIG. 14 illustrates another partial image display system 1400 (e.g., a system not including the storage and distribution portion of the system 100 of FIG. 1). The system 1400 includes a personal electronic device 1410 such as a wireless or cellular phone, a PDA, a player of digital music and/or video images (e.g., an MP-3 or similar format device), a handheld video game device, or the like. The device 1410 includes a set of user controls 1416 and a display screen 1412 that is used to display an interlaced image 1414 (here, shown as the entire image but, as described above, it may be provided as a portion of the image such as in a separate window or the like). Again, regardless of the display technology, the displayed image 1414 is typically provided at some offset distance from the outer surface of the screen 1412 such as up to a ¹⁄₁₆ inch or more within the device 1410.

To allow proper focusing, the system may make use of mounting assembly 1420, which in this case is provided in the form of a body or cover 1421 that may slide over the device 1410 with the outer edges of the device housing fitting into grooves or slots 1422. As illustrated, the cover/body 1421 does not wrap fully about or enclose the device 1410 but in other cases the body 1421 may provide a more complete sleeve such as being open at one or both ends with a slot or opening for receiving the device 1410. The cover 1421 includes a lens array 1430 with lenticules or lenses 1432 for focusing into the display screen 1412 onto an inner display surface on which the image 1414 is displayed. The cover 1421 may also include an opening for providing access to device controls 1416 (or the cover 1421 may only have a length that allows it to extend over all or a portion of the screen 1412). The slot 1422 may be adapted such that the device 1410 can only be received in one manner such as to provide a single air or focusing gap distance between the back of the lens array 1430 and the outer surface of the display screen 1412. In such cases, the lens array 1430 and its lenses 1432 are fabricated with knowledge of the offset or location of the inner display surface/image 1414 such that the air gap is proper to align the focal length or focus plane of the array 1430 on the image 1414 in the device 1410 (e.g. the cover or lens assembly 1420 is designed and fabricated for use with one or more particular devices). In other cases, the slots/grooves 1422 may be formed with two or more shelves or subgrooves to receive the device 1410 and to create two or more corresponding air gap thicknesses or distances, whereby the cover 1420 is at least somewhat more universal or useful with more than one device design.

The lens arrays of the invention can be formed from plastic, glass, ceramics, or other transparent to translucent materials from or using coatings, films, and/or other substrates. The lens sets can be conventional lenticular material modified to provide "long" focal lengths and the interlaced image is configured with a particular number of interlaced images under the lens set. The lenticular material or lens arrays of the invention may be fabricated using conventional and well-known methods for producing lenticular sheets, with the particular technique chosen not being limiting of the invention, and the arrays or sheets may be formed into or using a variety of materials. The materials used for forming the lens arrays may be glass, nearly any type of clear (i.e., transparent to translucent) plastic including but not limited to PET, propylene, OPP, PVC, APET, acrylic, or any clear plastic, and/or a ceramic. In many embodiments, the preferred base material is a plastic, and the plastic may be extruded, calendared, cast, or molded with the tools formed as described above to provide a mirror image of the lens arrays (e.g., a plurality of side-by-side, linear lenses selected in number to provide a desired frequency such as 10 to 70 LPI or more or another useful frequency to suit a particular interlaced image).

One preferred application or fabrication technique involves inline embossing at high speeds using a roll embossing tool. In this embodiment, a film is cast or extruded, and a pattern providing the lens array is placed into the film with a heat or chilled roller. A good film for this application is usually a stable film such as a PET, cast propylene film, or the like. These films can be embossed in thin films of less than one mil up to 3 mils or more. A preferred thickness for lens arrays may be in the two to thirty mil range. The film itself can be printed in a web or roll form at very high rates of speed (e.g., over 2,000 feet per minute) in wide web applications. The form image display devices (such as labels, decals, cards, or the like), the film or sheet with lens arrays is mirror or reverse printed with the corresponding interlaced images. At this point, individual devices or products may be cut from the combined rolls or sheets. The film also may be embossed in a thickness that is less than the desired thickness for focus and printing so that an adhesive can be added to the film (i.e., between the lens array and the image slices) so that in combination the adhesive and the film provide the thickness required to focus to the interlaced images properly. The index of refraction of both the film and the adhesive in combination is taken into account in the overall formula or algorithm discussed above for generating lens sets or lens microstructures. In some cases, a film may also be co-extruded with a coating such as a UV, solvent, or water-based coating that may be embossed or extruded on the film with the micro structures built into the coating.

With these various methods of manufacturing lens arrays and products including the arrays generally understood, it may be useful to further explain some of the preferred methods of manufacturing lens arrays according to the invention beginning with film embossing. Film embossing is a preferred method of manufacture that is anticipated to be easily adapted for producing lens array or material. In this embodiment of manufacture, there are several methods of performing the embossing. Embossing can occur at the time a film is cast, calendared, or extruded. Normally, the embossing is done in line with a chilled embossing roller while the film is still hot.

The pressure is applied between a bottom and top roller. For example, the bottom roller may be a polished roller and the top roller an engraved roller, e.g., made out of a nickel-coated copper that is accurately machined in an air-bearing lathe. The hot film, which may be propylene, PET, cast PVC, calendar PVC, cast propylene, PETG, or any combination of film or co-extrusion. While the preferred substrate or film may be polyester or PET, any of the substrates can be used. PET films tend to be more stable and maintain the desired structure through the printing and embossing process better than many of the other films. It is also important to note that the refractive index of the material chosen preferably is matched to the desired structure to provide accurate focusing on interlaced images slices within display screen. Depending upon width, temperatures, pressures, and other factors, the film may be embossed at up to 10,000 feet per minute. One reason for using a chill roller in the film embossing process is that the molecules in the film form and freeze into place forming the microstructures more accurately when a hot film is embossed with a chill roller regardless of the process.

In some embodiments, cold film is used. Cold film can be heated and embossed with a hot roller forming the microstructures. This is normally done at slightly below the melting temperature or at the melting temperature of the film. The speed at which this embossing can be done is based upon the heat and pressure of the equipment available. For example but not as a limitation, if a substrate melts at about 300° F., embossing is preferably done at about that temperature and, in some cases, at about 6,000 feet per hour. In other embodiments, cold embossing is used to form lens arrays of the present invention. Cold embossing can be done using extreme pressures between nip rollers while narrow web widths are easier and require less tonnage. It is possible, however, in some embodiments to emboss in wide web at up to and over 60-includes web widths. Such cold embossing of the lens arrays into plastic or other material substrates can be done at fairly high rates of speed such as up to about 10,000 feet per hour or more. This is done much the way holographic embossing patterns are embossed in film. The structures tend to be accurate, but the life of the tool is sometimes not very long due to the higher pressures utilized.

Film embossing to form lens arrays of the invention may also include platen embossing. Flat dies are engraved in copper, magnesium, nickel, and other metals. These dies are placed in equipment such as Bobst die cutters and Heidelberg's, Kluges, and other equipment manufacturers' die cutters, punches, presses, or the like used in platen embossing. The film may be Ted through in rolls or in sheets and embossed with heat and pressure or just pressure to form the lens sets on a side of the film or substrate. The lenticules or lenses can be embossed onto any of the films using pressure and/or heat and appropriate dwell time to form the microstructures. A significant tonnage or high pressure, such as that needed to emboss holograms, is generally used to emboss the film in the case of platen embossing. In this embodiment, one can have "spot" lens sets that can be registered to the printing in a way such that the lens does not always appear over the printing.

Another preferred method of forming lens arrays according to the present invention is by using an ultraviolet (UV) or e-beam coating to form the structures in a web over a film or substrate (i.e., the lens array would include both the substrate and the web/coating in its array thickness). In a first embodiment of such coating processes, a base film is used that may be any of the films mentioned above. The film may be coated with a UV coating at about 1 to 5 mils, and the coating can be cured through an engraved roller which may be glass or clear plastic. The roller is clear such that the UV or E-beam is directed to pass through the roller while it is in contact with the substrate and squeezing the coating into place on the base film, whereby the microstructures are formed exactly or within very tight tolerances while they are cured to form a lens array as shown in the included figures.

There are other preferred or alternative methods of using e-beam curing or UV curing to make lens arrays with lenses rather than using a clear cylinder to shine IJV light through while in contact with the embossing cylinder. For example, one coating method uses a modified laminator to emboss the pattern onto one surface of a film or substrate. This can be done or accomplished with very little pressure using an engraved cylinder and an application roller that applies UV or e-beam coating to the film (which is likely to be propylene, PET, or the like). The coating on the film or substrate is then cured through the film while the film is in contact with the embossed roller. In this method, the speed can be in excess of 10,000 feet per hour and can be done without excessive wear on the embossing cylinder. A downside or possible issue with this method is the cost, which tends to be higher because of the UV liquid used to cast the impression. However, because most of the lens sets are less than a few microns deep, a thin coating is sufficient for producing the lens microstructures (e.g., a coating of less than about 1 mil and more typically less than about 0.3 mils such as about 0.25 mils may be used successfully to create a plurality of lens sets or microstructures with a coating).

In an alternative coating process, a base film is coated with any of the clear coatings mentioned above (keeping in mind that any coating and its refractive index is combined with the thickness and appropriate film refractive index for the appropriate and pre-engineered thickness of the lens array). After the coating is applied to the substrate, it is cured and then embossed. In some cases, the coating is only partially cured and then embossed while it is in a semi-liquid state. In some other cases, the coating on the substrate or base film is embossed in a total liquid state or more liquid state and then cured after the embossing such as down the web a few feet up to several hundred feet. In the former case where the liquid is partially cured, the coating may have a final curing later down the production line either immediately or down the web several feet, and in some cases, the coating may be pre-engineered to post cure in a solid state several hours or even days later to an acceptable hardness.

Any and all of the methods described herein can be re-produced using a combination substrate with the same results and methods of manufacture. In these embodiments, the substrate or film itself can be made in several different ways. The base films may be a combination of APET, PETG, and/or combinations of film such as PET and other softer films. In many cases, the top line or layer of film is a softer film like polyethylene combined with a tougher substrate such as a polypropylene. In these combination substrates used for forming lens arrays, the base film can provide stability while the top film can be softer and easier to emboss with the lens sets or lens microstructures of the present invention to form a lens array including the top film and tougher substrate. An ideal combination may be a PET base film with a softer propylene film laminated with a solvent based adhesive or solvent less adhesive such as a urethane adhesive like "More Free 403" by Rohm and Haas. The top film can be laminated with a thermal film EVA adhesive as well.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, specific values have been presented for the number of lenses in a lens set and for numbers of interlaces provided in image sets, but these numbers can each vary significantly to practice the invention and the combinations that can be made of these two parameters also can vary widely. The above description provided some examples in which the interlaced image that would be used to create 3D or other effects was provided as a portion of the overall image such as in a window or the like. In some embodiments, though, the interlaced image makes up the entire or a larger portion of the displayed image, e.g., on smaller screen devices such as PDA and phones or to provide a 3D video stream for a movie, television show, or video game.

The lenses may have a vertical orientation or be horizontal. In the horizontal implementation, the displayed image may not be 3D but instead the lens array would more likely be used to decode an encoded image or at an angle from vertical or horizontal (e.g., 10 to 25 degrees or the like). In some embodiments, the "lenticules" are configured to provide a fly's eye array of lenses rather than in the more tropical elongate fashion. Each individual lens or lenticule of a lens array would still be configured to focus at a point or distance beyond the back of the lens array or lens substrate, but, in this case, the electronically displayed image would include an interlaced image configured especially for the fly's eye arrangement. For example, the lenses may take on more of the appearance shown in U.S. Pat. No. 5,644,431 to Magee, which is incorporated in its entirety herein by reference, or other nonelongate and instead circular or semispherical shapes to practice the present invention.

The lens array may have two or more regions such as a first region that has lenses or lenticules at first frequency (such as about 20 LPI or another frequency) while a second region has lenses or lenticules at a second frequency (such as about 30 LPI or another frequency that differs from the first frequency). The first region may be adjacent the second, be encircled by the second region, or frame or surround the second region. For example, a lens array may be provided that has a 20 LPI region and framed within this region would be a 30 LPI region. In a broadcast embodiment, such as television broadcast (e.g., a commercial or the like), the 30 LPI region may be provided adjacent a prize portion of the broadcast when the lens array is positioned near the display screen. In some cases, only winners would receive a lens array having the proper inner or prize region of the lens array to decode the winning message while for others it would remain blurry/unreadable or read a different message. To further assist in identifying winners in prize/game implementations or uses of the invention, it may be useful to print or provide an identifier or variable number on the decoder to be used in claiming the prize (e.g., not only know how/where to claim a prize but have to provide the decoder with the proper ID number or enter/give this number if claiming is remote via telephone or over the Internet or the like).

In some embodiments, the size of the electronically displayed image is varied in size over a predefined range to create a more universal image size. This may be thought of as transmitting a varying size or pulsing image. This size variance or pulsing is typically achieved via software mechanisms or tools (e.g., routines provided in any of a number of programming languages such a Java, DHTML, Flash, or the like). The pulsing or varying size image may be provided on a broadcast such as with a TV broadcast and/or over a wired or wireless digital communications network such as serving a web site or streaming content in such site or other Internet/network transmissions, blasts, broadcasts, and the like. In some examples, the image grows and shrinks over time or in a pulsing manner. Hence, when a user/viewer holds up or otherwise positions their lens array near a display screen adjacent the pulsing image, the image is out of focus over much of the image size or pulse range, but the image comes into focus when the sizing is a match (e.g., the combination of the lens array, the screen configuration, and the location/separation gap of the lens array properly work in conjunction). At such a matching point, the image is in proper focus or is revealed. The pulsing preferably would be slow enough to allow the viewer to read text in the displayed image or to adequately view the image (e.g., to read a message indicative of winning a game prize or other message). In this manner, the lens array may be more "universal" or useful with nearly any display screen and air or focusing gap than otherwise possible or achievable.

We claim:

1. A lens array for use with a display device operable to electronically display an image including an interlaced image using a display screen, the displayed image provided on an inner display surface that is offset a distance within the display device from an outer surface of the display screen, comprising:
    a substrate comprising a material that is at least translucent to light; and a plurality of lenticules formed on a side of the substrate, wherein the lenticules have a focal length greater than about a thickness of the lens array substrate, whereby the lenticules focus on the interlaced image on the inner display surface when the lens array is positioned proximate to the outer surface of the display screen,
    wherein the focal length is less than about 3 inches and is greater than a combination of the offset distance and the thickness the lens array substrate, whereby there is a gap between the lens array substrate and the outer surface of the display screen with the displayed image in focus through the lenticules.

2. The lens array of claim 1, wherein the focal length is greater than about $\frac{1}{16}$ inches.

3. The lens array of claim 1, wherein the lenticules are provided on the side of the substrate at two or more pitches.

4. The lens array of claim 1, wherein the interlaced image is a partial image missing a matching section and wherein the lens array further comprises the matching section of the interlaced image provided on the lens array substrate, whereby a full image is viewable though the lens array by viewing the partial image and the matching section concurrently.

5. The lens array of claim 1, further comprising a label on the substrate comprising a set of data, wherein the set of data identifies a source of the displayed image and wherein the displayed image is formed based on a signal from the source.

6. An image display system, comprising:
    a user electronic device comprising a display with a faceplate with a surface facing outward from the user electronic device, wherein the user electronic device operates the display to display an image including an interlaced portion at an internal offset distance from the surface of the faceplate; and
    a lens array comprising a first surface with a plurality of elongate lenses and a second surface opposite the first surface, the lens array comprising a thickness of material that is at least translucent to light and the lenses configured for focusing through the lens array material on a focus plane spaced apart from the second surface a distance greater than about the internal offset distance of the display, wherein a focal length is less than about 3 inches and is greater than a combination of an offset distance and a thickness of a lens array substrate, whereby there is a gap between the lens array substrate and an outer surface of a display screen with a displayed image in focus through lenticules.

7. The image display system of claim 6, further comprising a mounting mechanism attached to the user electronic device and positioning the lens array proximate to the faceplate such that the elongate lenses are adjacent the interlaced portion of the displayed image with a gap between the second surface of the lens array and the surface of the faceplate.

8. The image display system of claim 7, wherein the mounting mechanism is operable to selectively position the lens array relative to the faceplate to maintain the second surface substantially parallel to the surface of the faceplate while altering a size of the gap.

9. The image display system of claim 8, wherein the size of the gap is selected such that the focus plane substantially coincides with the displayed image.

10. The image display system of claim 8, wherein the size of the gap is adjustable from about 1/16 inch to about 3 inches.

11. The image display system of claim 6, further including a source of digital images comprising interlaced portions, wherein the source is communicatively linked with the user electronic device to provide the image with the interlaced portion.

12. The image display system of claim 11, wherein the interlaced portions comprise data related to a contest defining a first set of the digital images as winners and a second set of the digital images as non-winners of the contest.

13. The image display system of claim 6, wherein the user electronic device is selected from the group of devices consisting of a computing device, a television, a digital video player, a video game playing device, a wireless communication device, and a handheld personal electronic device.

14. The image display system of claim 13, wherein the display comprises a CRT display, an LCD display, or a plasma display.

* * * * *